United States Patent
Venkatraman et al.

(10) Patent No.: US 10,836,901 B2
(45) Date of Patent: Nov. 17, 2020

(54) COMPOSITE MATERIAL WITH ENHANCED MECHANICAL PROPERTIES AND A METHOD TO FABRICATE THE SAME

(71) Applicants: NANYANG TECHNOLOGICAL UNIVERSITY, Singapore (SG); SINGAPORE HEALTH SERVICES PTE LTD, Singapore (SG)

(72) Inventors: Subramanian Venkatraman, Singapore (SG); Yingying Huang, Singapore (SG); Hui Ying Ang, Singapore (SG); Nicolas Daniel Marie Foin, Singapore (SG); En Hou Philip Wong, Singapore (SG)

(73) Assignees: SINGAPORE HEALTH SERVICES PTE LTD, Singapore (SG); NANYANG TECHNOLOGICAL UNIVERSITY, Singapore (SG)

( * ) Notice: Subject to any disclaimer, the term of this patent is extended or adjusted under 35 U.S.C. 154(b) by 91 days.

(21) Appl. No.: 16/076,580

(22) PCT Filed: Feb. 13, 2017

(86) PCT No.: PCT/SG2017/050061
§ 371 (c)(1),
(2) Date: Aug. 8, 2018

(87) PCT Pub. No.: WO2017/138888
PCT Pub. Date: Aug. 17, 2017

(65) Prior Publication Data
US 2019/0048182 A1 Feb. 14, 2019

(30) Foreign Application Priority Data
Feb. 12, 2016 (SG) .......................... 10201601052Q

(51) Int. Cl.
*C08L 67/04* (2006.01)
*C08K 9/06* (2006.01)
(Continued)

(52) U.S. Cl.
CPC ................ *C08L 67/04* (2013.01); *C08K 3/22* (2013.01); *C08K 3/30* (2013.01); *C08K 7/08* (2013.01);
(Continued)

(58) Field of Classification Search
CPC ... C09C 3/10; C08K 9/10; C08K 9/04; D01D 5/34; C08L 67/04
See application file for complete search history.

(56) References Cited

U.S. PATENT DOCUMENTS

2009/0318594 A1* 12/2009 Grothe ..................... C08K 3/30
524/148
2010/0075062 A1   3/2010 Wang et al.
2013/0221279 A1*  8/2013 Xu .......................... B82Y 30/00
252/301.36

FOREIGN PATENT DOCUMENTS

CN   101928996 A   12/2010
CN   102459355 A    5/2012
(Continued)

OTHER PUBLICATIONS

Horch et al., "Nanoreinforcement of Poly(propylene fumarate)-Based Networks with Surface Modified Alumoxane Nanoparticles for Bone Tissue Engineering," *Biomacromolecules* 5:1990-1998, 2004.
(Continued)

*Primary Examiner* — Mark S Kaucher
(74) *Attorney, Agent, or Firm* — Seed Intellectual Property Law Group LLP

(57) ABSTRACT

According to the present disclosure, a hydrophobic polymeric composite comprising a hydrophobic polymer matrix
(Continued)

with hydrophobically modified particles dispersed therein is provided. The hydrophobically modified particles may be derived from hydrophilic particles modified with organic moieties. The hydrophobically modified particles may also take in the form of core-shell fibers with hydrophilic particles encapsulated inside the core of said fibers or in the form of monolithic fibers embedded with hydrophilic particles. The method for making hydrophobic polymeric composite comprising each of the various hydrophobically modified particles is also provided. The hydrophobic polymer matrix can be chosen from poly(alpha-hydroxyesters), of carbonates, polyurethanes or polyalkanoates. For example, hydrophilic particles, such as barium sulphate, zirconium oxide, tantalum oxide or bismuth oxide, are dispersed in the hydrophobic biodegradable polymers, such as poly-(L-lactide) (PLLA).

13 Claims, 20 Drawing Sheets

(51) Int. Cl.

| | |
|---|---|
| *D01D 5/00* | (2006.01) |
| *D01D 5/34* | (2006.01) |
| *D01F 1/10* | (2006.01) |
| *D01F 6/62* | (2006.01) |
| *D01F 8/16* | (2006.01) |
| *C09C 3/10* | (2006.01) |
| *C09C 3/00* | (2006.01) |
| *C09C 3/12* | (2006.01) |
| *C08K 9/04* | (2006.01) |
| *C09C 3/08* | (2006.01) |
| *C08K 3/22* | (2006.01) |
| *C08K 3/30* | (2006.01) |
| *C08K 9/10* | (2006.01) |
| *C08K 7/08* | (2006.01) |
| *C03C 17/32* | (2006.01) |

(52) U.S. Cl.
CPC .......... *C08K 9/04* (2013.01); *C08K 9/06* (2013.01); *C08K 9/10* (2013.01); *C09C 3/00* (2013.01); *C09C 3/08* (2013.01); *C09C 3/10* (2013.01); *C09C 3/12* (2013.01); *D01D 5/00* (2013.01); *D01D 5/003* (2013.01); *D01D 5/0023* (2013.01); *D01D 5/34* (2013.01); *D01F 1/10* (2013.01); *D01F 6/625* (2013.01); *D01F 8/16* (2013.01); *C03C 17/322* (2013.01); *C03C 17/324* (2013.01); *C08K 2003/2244* (2013.01); *C08K 2003/3045* (2013.01); *C08K 2201/005* (2013.01); *C08K 2201/018* (2013.01); *C08L 2201/06* (2013.01)

(56) References Cited

FOREIGN PATENT DOCUMENTS

| | | | |
|---|---|---|---|
| CN | 103381486 | A | 11/2013 |
| CN | 104788924 | A | 7/2015 |
| CN | 104987681 | A | 10/2015 |
| CN | 105175929 | B | 5/2018 |
| CN | 104788924 | B * | 12/2018 |
| JP | 2009-24117 | A | 2/2009 |
| JP | 2011-201740 | A | 10/2011 |

OTHER PUBLICATIONS

Ren et al. "Rheology of Highly Filled Polypropylenes Prepared with Surface Treated Fillers," *Polymers & Polymer Composites* 11(7):541-550, 2003.

Chinese Office Action, for Chinese application No. 201780023576.1, dated Mar. 4, 2020, 16 pages (with English Machine Translation).

Liu et al., "Enhanced thermal decomposition kinetics of poly(lactic acid) sacrificial polymer catalyzed by metal oxide nanoparticles," *RSC Adv.* 5:101745-101750, 2015.

Rothon, "Particulate Fillers for Polymers," *Rapra Technology Limited*, 2002. (161 pages).

* cited by examiner

COMPOSITE MATERIAL WITH ENHANCED MECHANICAL PROPERTIES AND A METHOD TO FABRICATE THE SAME

CROSS-REFERENCE TO RELATED APPLICATION

This application claims the benefit of priority of Singapore Patent Application No. 10201601052Q, filed 12 Feb. 2016, the content of it being hereby incorporated by reference in its entirety for all purposes.

TECHNICAL FIELD

The present disclosure relates to a hydrophobic polymeric composite comprising a hydrophobic polymer matrix with hydrophobically modified particles dispersed therein. The present disclosure also relates to a method of synthesizing such a hydrophobic polymeric composite.

BACKGROUND

Biodegradable polymeric devices have been used extensively in the medical field as tissue engineering scaffolds, medical sutures and more recently, as coronary stents. The biodegradable polymeric devices may be broken down after performing their required functions, eliminating the need for surgical intervention to remove them and allowing for the possibility of a second intervention at the same site. However, a limitation of using polymers may be their low mechanical properties compared to other candidates such as metals, and this may severely impede their usage in many load-bearing applications. In the case of biodegradable stents, they tend to have significantly lower mechanical strength (low radial strength and low fracture toughness), which tend to result in thicker struts in polymeric stent design, thereby affecting deliverability.

Nano-sized or micro-sized fillers may possess a large surface to volume ratio that increases the number of particle-matrix interactions, which may improve the overall material properties when incorporated. The use of a composite material thus capitalizes on the biodegradability of the base polymer while enhancing the strength of the composite device. To maximize the strength of the fillers, a uniform dispersion and good integration of the particles in the polymer matrix may be desired. A strong interfacial bonding between the fillers and polymer is likely to lead to an effective transfer of load from the matrix to the fillers. On the other hand, a lack of adhesion or compatibility between the two phases may lead to phase separation and early device failure, thereby forming a major challenge in the fabrication of composite devices.

Most of the polymers may be hydrophobic and incompatible with hydrophilic fillers (which may prefer to agglomerate) and the weak filler-polymer affinity often tend to have a negative effect on the mechanical strength of the composite. When the fillers are mixed with the polymer, uniform dispersion of the fillers may be difficult to achieve as the fillers may agglomerate together. The agglomeration of fillers results in large particulates within the matrix and these may act as stress concentration points which are likely to cause material failure. Therefore, ensuring good integration and distribution of the fillers is critical.

Thus, there is a need to provide for a hydrophobic polymeric composite that ameliorates one or more of the abovementioned limitations when incorporated or dispersed with hydrophilic fillers or particles.

There is also a need to provide a method for making a hydrophobic polymeric composite incorporated or dispersed with hydrophilic fillers or particles without suffering from one or more of the above drawbacks.

SUMMARY

In one aspect, there is a hydrophobic polymeric composite comprising a hydrophobic polymer matrix with hydrophobically modified particles dispersed therein, wherein the hydrophobically modified particles each comprises a hydrophilic particle comprising an organic moiety which changes the hydrophilic particle into a hydrophobically modified particle, and wherein the hydrophilic particle comprises barium sulphate, zirconia oxide, tantalum oxide or bismuth oxide.

In another aspect, there is a method of synthesizing a hydrophobic polymeric composite with hydrophobically modified particles dispersed therein, the method comprising the steps of: separately contacting hydrophilic particles with a conjugating agent and then a functionalizing agent to change the hydrophilic particles into the hydrophobically modified particles, wherein the hydrophilic particles comprise barium sulphate, zirconia oxide, tantalum oxide or bismuth oxide; and blending the hydrophobically modified particles with a hydrophobic polymer matrix to form the hydrophobic polymeric composite.

In another aspect, there is a hydrophobic polymeric composite comprising a hydrophobic polymer matrix with hydrophobically modified particles dispersed therein, wherein the hydrophobically modified particles comprise hydrophilic particles encapsulated in a core of a core-shell fiber.

In another aspect, there is a method of synthesizing a hydrophobic polymeric composite with hydrophobically modified particles dispersed therein, the method comprising the steps of: coaxially electrospinning a shell solution comprising a hydrophobic polymer and a core solution comprising hydrophilic particles with a hydrophilic polymer to form the hydrophobically modified particles in the form of a core-shell fiber; and blending the hydrophobically modified particles with a hydrophobic polymer matrix to form the hydrophobic polymeric composite.

In another aspect, there is a hydrophobic polymeric composite comprising a hydrophobic polymer matrix with hydrophobically modified particles dispersed therein, wherein the hydrophobically modified particles comprise hydrophilic particles embedded in a monolithic fiber.

In another aspect, there is a method of synthesizing a hydrophobic polymeric composite with hydrophobically modified particles dispersed therein, the method comprising the steps of: electrospinning a hydrophobic polymer solution comprising a hydrophobic polymer and hydrophilic particles to form the hydrophobically modified particles in the form of a monolithic fiber; and blending the hydrophobically modified particles with a hydrophobic polymer matrix to form the hydrophobic polymeric composite.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the present disclosure are described with reference to the following drawings, in which:

FIG. 4A shows the agglomeration of non-functionalized fillers in a hydrophobic polymer matrix.

FIG. 4B shows favourable interaction of functionalized fillers having the organic moiety (bi-functional) with the hydrophobic polymer matrix.

FIG. 4C shows the favourable interaction between the functionalized fillers with the polymer matrix, wherein the fillers are composed of core-shell fibers encapsulating hydrophilic particles.

FIG. 12A shows the effect of annealing temperature on tensile modulus of the resultant composite using different fillers.

FIG. 12B shows the effect of annealing temperature on tensile strength of the resultant composite using different fillers.

FIG. 17B is a magnified version of FIG. 17A.

FIG. 17D is a magnified version of FIG. 17C.

DETAILED DESCRIPTION

Figure 1A:
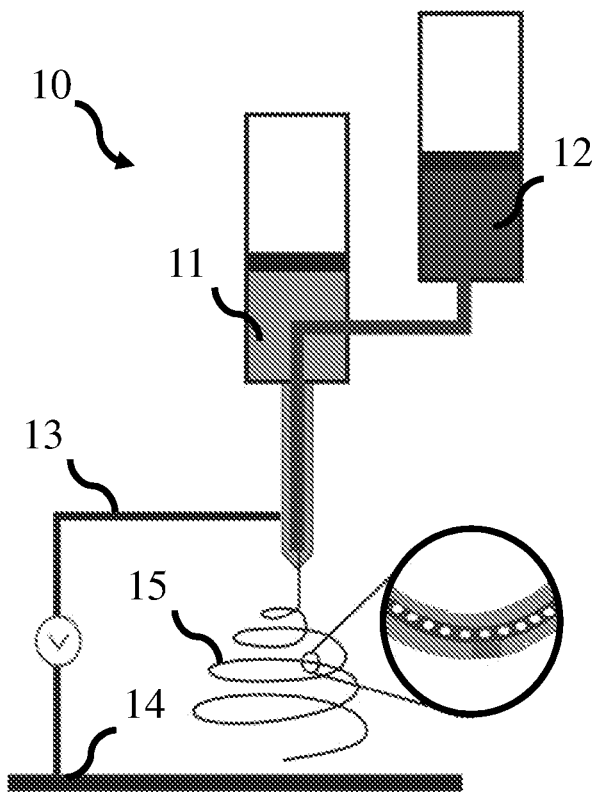
FIG. 1A illustrates a schematic diagram of the coaxial electrospinning process according to the embodiments as disclosed herein.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Embodiments described in the context of the hydrophobic polymeric composite are analogously valid for the method described herein for making the hydrophobic polymeric composite, and vice versa.

The present disclosure describes the incorporation or dispersal of modified hydrophilic fillers in a hydrophobic platform. The modified hydrophilic fillers possess improved adhesion and dispersion in a hydrophobic polymeric environment, thereby improving the mechanical properties of the composite material. The improvements may be attained via the following manner.

There may be two ways to improve the dispersion of fillers in a hydrophobic polymeric environment: either (1) decrease the hydrophilicity of the fillers and/or (2) increase the affinity of the fillers to the hydrophobic polymer.

To decrease hydrophilicity of the fillers, this may be achieved by chemically conjugating hydrophobic functional groups to the surface of the fillers.

Meanwhile, to increase the affinity of the hydrophilic fillers to the hydrophobic polymer, a compatible platform may be provided in which the fillers may be incorporated or dispersed before being added to the hydrophobic polymer. This may allow the hydrophilicity of the fillers to be "shielded" from the hydrophobic environment or polymer (thus promoting adhesion) while keeping the reinforcement property of the fillers.

With the above in mind, the present disclosure provides for a hydrophobic polymeric composite and a method of synthesizing such a hydrophobic polymeric composite.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

Before going into the details of the hydrophobic polymeric composite, the method of making such hydrophobic polymeric composite and the various embodiments, the definition of certain terms, expressions and phrases are provided as follows.

In the context of the present application, the phrase "organic solvent" refers to a carbon-based solution that is capable of dissolving a polymer. The organic solvent may be polar or non-polar.

In the context of the present disclosure, the term "hydrophobic" refers to materials or substances that do not form hydrogen bonds with water. Hence, "hydrophobic" materials or substances tend to be immiscible with water and/or tend to maintain a separate distinct phase from water. In this regard, the phrase "immiscible" means that the materials or substances do not mix and/or tend to separate when left to stand. Meanwhile, the term "hydrophilic" refers to materials or substances that form hydrogen bonds with water. Hence, "hydrophilic" materials or substances tend to be miscible with water and/or tend not to maintain a separate distinct phase from water.

The word "substantially" does not exclude "completely" e.g., a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Having defined the various terms, expressions and phrases as indicated above, the details of the hydrophobic polymeric composite, its method of making and the various embodiments are described as follow.

In the present disclosure, there may be a hydrophobic polymeric composite comprising a hydrophobic polymer matrix with hydrophobically modified particles dispersed therein, wherein the hydrophobically modified particles each comprises a hydrophilic particle comprising an organic moiety which changes the hydrophilic particle into a hydrophobically modified particle, and wherein the hydrophilic particle comprises barium sulphate, zirconia oxide, tantalum oxide or bismuth oxide.

The organic moiety may be a bi-functional organic compound. This implies the organic moiety may comprise a group that may be compatibly attached to the hydrophilic particles (i.e. conjugating group) and another group (i.e. functional group) that may enable the hydrophilic particles to become compatible with the hydrophobic polymer matrix such that it may prevent agglomeration of the hydrophilic particles when dispersed or incorporated in the hydrophobic polymer matrix. The organic moiety may be a single compound or a compound formed from two or more compounds, such as but are not limited to, a conjugating agent and a compound with a desired functional group for enabling compatibility with hydrophobic materials e.g. the hydrophobic polymer matrix. Accordingly, the organic moiety may comprise a conjugating group and a functional group.

In general, where hydrophilic particles are modified to become hydrophobically modified particles, the latter may be known as functionalized fillers. Hence, a hydrophobically modified particle obtained from a hydrophilic particle modified by an organic moiety as described above may be called a functionalized filler.

In this regard and in the context of the present disclosure, the term "functionalized" or its grammatical variants, refers to a material that has been modified from being hydrophilic to become compatible with hydrophobic materials or possessing hydrophobic properties.

Meanwhile, the terms "functionalizing agent", "functionalizing compound" etc. refer to material(s) used to modify a hydrophilic material such that it becomes compatible with hydrophobic materials or changing the hydrophilic material to possess hydrophobic properties. One non-limiting example may be the organic moiety as described above. The organic moiety may comprise a functional group that imparts hydrophobicity to a hydrophilic particle. The organic moiety modifies the hydrophilic particle into a hydrophobic particle. In another example, when the hydrophilic particle becomes encapsulated in a core-shell fiber where the shell may be hydrophobic, this can enhance dispersability and compatibility of the hydrophilic particle in hydrophobic polymers, and such a modified hydrophilic particle in the form of a core-shell fiber encapsulating hydrophilic particle(s) may also be called a functionalized particle or filler. In another example, hydrophilic particle(s) may be embedded in a monolithic fiber. The monolithic fiber may be composed of a hydrophobic polymer. The hydrophobic polymer of the monolithic fiber helps to enhance dispersability and compatibility of the embedded hydrophilic particle(s) in hydrophobic polymers. Such a monolithic fiber embedded with hydrophilic particle(s) may also be called a functionalized particle or filler. Hydrophobic polymeric composites utilizing fillers that are constructed in the form of core-shell fibers and/or monolithic fibers are disclosed below, after the embodiments describing hydrophobically modified particles derived using the organic moiety.

In view of the definition of "functionalized" as provided above, the expression "non-functionalized" or its grammatical variants as used herein, then refers to a hydrophilic particle that has not been modified to become compatible with hydrophobic materials or to possess hydrophobic properties.

Referring back to the organic moiety as mentioned above, the organic moiety may comprise a conjugating group and a functional group. The conjugating group may be derived from a conjugating agent. The conjugating agent may be a coupling agent. In various embodiments, the conjugating agent, and hence the conjugating group, may be derived from silane coupling agents, titanate coupling agents, aluminate coupling agents, double metal coupling agents, borate coupling agents and/or rare earth coupling agents. The silane coupling agents may comprise (3-mercaptopropyl)trimethoxysilane.

The functional group may be derived from hydrophobic compounds. The functional group may be derived from or may comprise a hydrocarbon with one or more alkyl chains having 3 to 30 carbon atoms, stearic acid or L-lactic acid. The one or more alkyl chains may also have 3 to 20 carbon atoms, 3 to 10 carbon atoms, 5 to 20 carbon atoms, 5 to 10 carbon atoms, or any other number of carbon atoms within these specified ranges.

In the present disclosure, apart from composites incorporated or dispersed with hydrophilic particles modified with organic moieties, there may be a hydrophobic polymeric composite comprising a hydrophobic polymer matrix with hydrophobically modified particles dispersed therein, wherein the hydrophobically modified particles comprise hydrophilic particles encapsulated in a core of a core-shell fiber.

Additionally, there may be a hydrophobic polymeric composite comprising a hydrophobic polymer matrix with hydrophobically modified particles dispersed therein, wherein the hydrophobically modified particles comprise hydrophilic particles embedded in a monolithic fiber.

Regardless of the configuration of the fillers (i.e. hydrophilic particles modified with the organic moiety, core-shell fibers or monolithic fibers), the hydrophobic polymeric composite incorporated with such fillers may be a biocompatible and biodegradable composite useful for making biomedical devices. The hydrophobic polymeric composite may be made from or comprise a combination of hydrophobic and hydrophilic materials even though these materials may be incompatible as the present method taught herein mitigates the incompatibility between hydrophobic polymers and their hydrophilic fillers or particles. The hydrophobic polymeric composite may be composed of materials such as a hydrophobic polymer matrix or a hydrophobic polymer resin, both of which may be processed by blending, compounding or mixing with other materials. Other suitable forms may be used. The hydrophobic polymer matrix or resin may comprise the hydrophobically modified particles.

In various embodiments, the hydrophobic polymer matrix may comprise poly(alpha-hydroxyesters), polycarbonates, polyurethanes or polyalkanoates. Non-limiting examples of poly(alpha-hydroxyesters) may include or may be selected from the group consisting of polylactic acid (PLA), poly-(l-lactide) (PLLA), poly-(d,l-lactide) (PDLA), poly(glycolic) acid (PGA), poly(lactide-co-glycoside acid) (PLGA), polycaprolactone (PCL), poly(p-dioxanone) (PDO) and/or poly(lactide-co-trimethylene carbonate) (PTMC). Non-limiting examples of polyalkanoates may comprise or include poly(3-hydroxybutyrate) (PHB). In the present disclosure, the poly(alpha-hydroxyesters) may be selected from the group consisting of PLA, PLLA, PDLA, PGA, PLGA, PCL, PDO and PTMC. In the present disclosure, the polyalkanoates may comprise PHB. Advantageously, these polymers are biodegradable, thus making them suitable for biomedical applications such as coronary stent applications.

As mentioned above, the hydrophobic polymer matrix may comprise hydrophobically modified particles dispersed or incorporated therein according to various embodiments.

This means the hydrophobically modified particles may be found within the hydrophic polymer matrix and/or on the surface of the hydrophobic polymer matrix. The hydrophobically modified particles may also be partially embedded in the hydrophobic polymer matrix.

The hydrophobically modified particles may be derived from hydrophilic particles. The hydrophobically modified particles may serve as fillers to enhance mechanical properties of the hydrophobic polymer matrix and thus those of the resultant hydrophobic polymeric composite. The hydrophilic particles may be micro-sized or nano-sized. In other words, the hydrophilic particles may be microparticles or nanoparticles or a mixture of both. These particles (before becoming hydrophobically modified) may be 1 nm to 1000 nm, 1 nm to 500 nm or any other size falling within these specified ranges. Because the hydrophilic particles may take on any shape, the sizes measured or indicated above may refer to the diameter or a longest dimension of a hydrophilic particle. For instance, if the hydrophilic particle is spherical or at least substantially spherical, then the size measured or indicated above may refer to the diameter. In another instance, if the hydrophilic particle has one longer dimension over its other dimension(s), then the size indicated above may refer to the hydrophilic particle's length. Meanwhile, the resultant filler or hydrophobically modified particle dispersed or incorporated into the hydrophobic polymer matrix may be of a size sufficient to effectively provide enhancement to the mechanical properties of the composite. In various embodiments, the hydrophobically modified particles or fillers, which is to say, the hydrophobically modified particles comprising the organic moiety, and/or the core-shell fibers and/or the monolithic fibers that may be dispersed in the hydrophobic polymeric composite may be 1 nm to 100 μm, 50 nm to 50 μm or any other size or range falling within these specified ranges. These ranges are larger because the resultant fillers or hydrophobically modified particles incorporate the modifications made to hydrophilic particles. The hydrophobically modified particles or fillers may comprise any shape, such as but not limited to, sphere or at least substantially spherical, cylindrical or at least substantially cylindrical, or in the form of a fiber, such as a core-shell fiber or monolithic fiber. Bearing this in mind, the size indicated above for the hydrophobically modified particles or resultant fillers may also refer to the diameter when the hydrophobically modified particles or resultant fillers are spherical or at least substantially spherical, or the diameter of a fiber when the hydrophobically modified particles are in the form of core-shell fibers or monolithic fibers.

In the present disclosure, the hydrophilic particles may comprise or may be composed of at least one metal oxide and/or at least one metal sulphate. This means the hydrophilic particles may be hydrophilic metal oxide particles and/or hydrophilic metal sulphate particles. The hydrophilic particles may comprise or may be selected from the group consisting of barium sulphate ($BaSO_4$), zirconia oxide ($ZrO2$), tantalum oxide ($Ta_2O_5$), and/or bismuth oxide ($Bi_2O_3$). These materials may impart additional advantageous properties. For example, compounds such as barium sulfate and zirconia oxide may be suitable for use in the medical industry, where the earlier may additionally double up as a contrast agent for imaging (barium sulfate) while the latter may be fillers for dental implant (zirconia, or even bismuth oxide). Meanwhile, tantalum may be used in orthopedic and dental applications.

As mentioned above, there may be embodiments where the hydrophobically modified particles take on the form of a fiber. The materials used for the hydrophilic particles and hydrophobic polymer matrix as mentioned above may be applicable for embodiments relating to fibers.

The fiber may be a core-shell fiber according to various embodiments. The core-shell fiber may comprise a core which encapsulates the hydrophilic particles. This means that the hydrophilic particles may be contained entirely within the core or located at the surface boundary between the core and the shell of the fiber.

The core and the shell may be composed of a hydrophilic and hydrophobic material, respectively. The core and shell materials may be immiscible, which implies the core and shell materials (e.g. the solutions) may not mix and may separate when left to stand. This may be required as the core containing the hydrophilic particles may have to be compatible such that it avoids causing the hydrophilic particles to aggregate when the hydrophilic particles are encapsulated in the core. Meanwhile, the hydrophobic shell may help to ensure compatibility between the core-shell fiber and the hydrophobic polymer matrix.

The hydrophilic material for the core may be a hydrophilic polymer that may be biodegradable and/or biocompatible. The hydrophilic polymer may be suitable for coaxial electrospinning such that the hydrophilic polymer is capable of being electrospun to form the core of a core-shell fiber when hydrophobic polymers are used to form the shell. In various instances, the core may comprise a hydrophilic polymer. The hydrophilic polymer may be selected from the group consisting of polyvinyl alcohol (PVA), polyvinylpyrrolidone (PVP), poly(acrylic acid) (PAA), polyethylene oxide (PEO) and polyethylene glycol (PEG).

As for the shell of a core-shell fiber described above, it may be composed of hydrophobic materials that are suitable for coaxial electrospinning with hydrophilic polymers as the core. The hydrophobic material for the shell may be a polymer. The polymer may be biodegradable and/or biocompatible. In such instances, the shell may be made from or comprise a hydrophobic polymer. The hydrophobic polymer used to make the shell of the core-shell fiber may have to be compatible with the material of the hydrophobic polymer matrix even if the polymers used may be different. Compatibility is also attainable when the shell is of the same polymer as the hydrophobic polymer matrix. Accordingly, the core-shell fiber may comprise a shell composed of a hydrophobic polymer which is different or same as the hydrophobic polymer matrix. In other words, the hydrophobic polymer used to construct the shell may be different or same as the hydrophobic polymer of the hydrophobic polymer matrix. To put it the other way round, the hydrophobic polymer matrix may be composed of or comprise the same or different hydrophobic polymer used to make the shell. The hydrophobic polymer, or more precisely, the core-shell fiber may comprise a shell composed of a hydrophobic polymer comprising poly(alpha-hydroxyesters), polycarbonates, polyurethanes or polyalkanoates. The poly(alpha-hydroxyesters) may be selected from the group consisting of polylactic acid, poly-(l-lactide), poly-(d,l-lactide), poly(glycolic) acid, poly(lactide-co-glycoside acid), polycaprolactone, poly(p-dioxanone) and poly(lactide-co-trimethylene carbonate). The polyalkanoates may comprise poly(3-hydroxybutyrate).

According to various embodiments, the core-shell fiber encapsulating the hydrophilic particles may be 1 nm to 100 μm, 50 nm to 50 μm or may have any other diameters falling within this specified range. This represents the diameter of the resultant fibers or particles dispersed or incorporated into the hydrophobic polymer matrix. The fiber size (i.e. the diameter) may also be 100 nm to 1000 μm or 1 μm to 100

μm. Accordingly, the diameter of the core-shell fiber used as the resultant filler may be 1 nm to 100 μm or 50 nm to 50 μm.

Apart from core-shell fibers, there may be embodiments where the hydrophobically modified particles take on the form of monolithic fibers as mentioned above. In context of the present disclosure, monolithic fibers may be fibers composed of a single polymer without a core-shell configuration. In other words, from a cross-sectional view, monolithic fibers are not composed of multilayers like those of a core-shell fiber, which has a core layer and a shell layer observable from the cross-sectional view.

The monolithic fibers may have the hydrophilic particles embedded therein. This means the hydrophilic particles may be contained entirely within or partially embedded in the monolithic fibers. The hydrophilic particles may also or alternatively be located on the surface of the monolithic fiber. In order to be compatible with the hydrophobic polymer matrix, the monolithic fibers may be made from or comprise hydrophobic polymers identical to those of the hydrophobic polymer matrix. The hydrophobic polymers used to construct the monolithic fibers may also be different from that of the hydrophobic polymer matrix as long as it is compatible. Accordingly, the monolithic fiber may be composed of a hydrophobic polymer which may be different or same as the hydrophobic polymer matrix. In other words, the hydrophobic polymer used to construct the monolithic fiber may be the same or different from the hydrophobic polymer used to construct the hydrophobic polymer matrix.

The hydrophobic polymer, or more precisely, the monolithic fiber may be composed of a hydrophobic polymer comprising poly(alpha-hydroxyesters), polycarbonates, polyurethanes or polyalkanoates. The poly(alpha-hydroxyesters) may be selected from the group consisting of polylactic acid, poly-(l-lactide), poly-(d,l-lactide), poly(glycolic) acid, poly(lactide-co-glycoside acid), polycaprolactone, poly(p-dioxanone) and poly(lactide-co-trimethylene carbonate). The polyalkanoates may comprise poly(3-hydroxybutyrate).

The monolithic fibers embedded with the hydrophilic particles may be 1 nm to 100 μm, 50 nm to 50 μm or may have any other diameters falling within this specified range. This represents the diameter of the resultant monolithic fibers dispersed or incorporated into the hydrophobic polymer matrix. The monolithic fiber size (i.e. the diameter) may also be 100 nm to 1000 μm or 1 μm to 100 μm. Accordingly, the diameter of the monolithic fiber used as the resultant filler may be 1 nm to 100 μm or 50 nm to 50 μm.

In the present disclosure, the composition of the hydrophobic polymeric composite may have between 1% and 40% of the functionalized nano-sized or micro-sized fillers by weight, or between 5% and 20% functionalized fillers by weight relative to the final weight of the composite. The functionalized nano-sized or micro-sized fillers may be hydrophobically modified particles derived using the organic moiety, or those configured to have the form of the core-shell or monolithic fibers. Accordingly, the hydrophobically modified particles may comprise 1 wt % to 40 wt % of the hydrophobic polymeric composite. The expression "wt %" interchangably represents the phrase "weight percent" or "weight percentage".

For embodiments relating to hydrophobically modified particles derived using organic moieties or configured to have the form of a core-shell fiber, the present disclosure provides the method for synthesizing such hydrophobically modified particles. The method is described immediately as follows.

According to the present disclosure, there is a method of synthesizing a hydrophobic polymeric composite with hydrophobically modified particles dispersed therein, the method comprising the steps of:

separately contacting hydrophilic particles with a conjugating agent and then a functionalizing agent to change the hydrophilic particles into the hydrophobically modified particles, wherein the hydrophilic particles comprise barium sulphate, zirconia oxide, tantalum oxide or bismuth oxide; or coaxially electrospinning a shell solution comprising a hydrophobic polymer and a core solution comprising hydrophilic particles with a hydrophilic polymer to form the hydrophobically modified particles in the form of a core-shell fiber; and blending the hydrophobically modified particles from either of the above steps with a hydrophobic polymer matrix to form the hydrophobic polymeric composite.

Accordingly, the present disclosure may describe a method of synthesizing a hydrophobic polymeric composite with hydrophobically modified particles dispersed therein, wherein the method may comprise the steps of separately contacting hydrophilic particles with a conjugating agent and then a functionalizing agent to change the hydrophilic particles into the hydrophobically modified particles, wherein the hydrophilic particles comprise barium sulphate, zirconia oxide, tantalum oxide or bismuth oxide, and blending the hydrophobically modified particles with a hydrophobic polymer matrix to form the hydrophobic polymeric composite.

Accordingly, the present disclosure may also describe a method of synthesizing a hydrophobic polymeric composite with hydrophobically modified particles dispersed therein. The method may comprise the steps of coaxially electrospinning a shell solution comprising a hydrophobic polymer and a core solution comprising hydrophilic particles with a hydrophilic polymer to form the hydrophobically modified particles in the form of a core-shell fiber, and blending the hydrophobically modified particles with a hydrophobic polymer matrix to form the hydrophobic polymeric composite.

Apart from the above, the present disclosure additionally describes a method for synthesizing hydrophobically modified particles in the form of monolithic fibers.

Accordingly, the present disclosure further describes a method of synthesizing a hydrophobic polymeric composite with hydrophobically modified particles dispersed therein, wherein the method may comprise the steps of electrospinning a hydrophobic polymer solution comprising a hydrophobic polymer and hydrophilic particles to form the hydrophobically modified particles in the form of a monolithic fiber; and blending the hydrophobically modified particles with a hydrophobic polymer matrix to form the hydrophobic polymeric composite.

Based on the above, the present method generally comprises a step of forming the various configurations of hydrophobically modified particles before blending the hydrophically modified particles with the hydrophobic polymer matrix. The description on the step of forming the various configurations of hydrophobically modified particles follows below, starting with embodiments related to the synthesis of hydrophobically modified particles derived from the conjugating agent and functionalizing agent, followed by the synthesis of hydrophobically modified particles in the form of core-shell fibers and then those synthesized in the form of monolithic fibers. Thereafter, the blending step of the present method is disclosed in general before going into the details of the various types of blending steps.

Referring to the method where a conjugating agent and a functionalizing agent are involved, there may be a step of contacting the hydrophilic particles with a conjugating agent. Subsequently, the hydrophilic particles may be contacted or mixed with a functionalizing agent as described above. The conjugating agent may complex or attach to the surface of the hydrophilic particle and help to attach the functionalizing agent to the particle. The contacting step involving a conjugating agent and a functionalizing agent helps to functionalize the hydrophilic particles by changing them into hydrophobically modified particles through imparting a conjugating group and a functional group to the hydrophilic particles. Together, the conjugating agent and functionalizing agent help to form an organic moiety which changes the hydrophilic particles to hydrophobically modified particles.

The conjugating agent may be selected from the group consisting of silane coupling agents, titanate coupling agents, aluminate coupling agents, double metal coupling agents, borate coupling agents and/or rare earth coupling agents. The silane coupling agents comprise (3-mercaptopropyl)trimethoxysilane. The conjugating agent may also comprise a conjugating group derived from silane coupling agents, titanate coupling agents, aluminate coupling agents, double metal coupling agents, borate coupling agents and/or rare earth coupling agents. The silane coupling agents comprise (3-mercaptopropyl)trimethoxysilane. Independently, the functionalizing agent may comprise a hydrocarbon with one or more alkyl chains having 3 to 30 carbon atoms, stearic acid or L-lactic acid. Independently, the functionalizing agent may also comprise a functional group derived from or comprising a hydrocarbon with one or more alkyl chains having 3 to 30 carbon atoms, stearic acid or L-lactic acid. The one or more alkyl chains may also have 3 to 20 carbon atoms, 3 to 10 carbon atoms, 5 to 20 carbon atoms, 5 to 10 carbon atoms, or any other number of carbon atoms within these specified ranges.

Turning to embodiments that relate to the synthesis of hydrophobically modified particles in the form of core-shell fibers, such embodiments may utilize coaxial electrospinning as one of the steps for forming hydrophobically modified particles in the form of core-shell fibers. A coaxial electrospinning often utilizes a setup that may allow a multiple-solution feed system which may utilize the injection of one solution into another at the tip of a spinneret. The sheath or shell fluid may act as a carrier which may draw in the inner or core fluid at a Taylor Cone of the electrospinning jet. If the solutions are immiscible, then a core-shell structure may be attained.

The electrospinning may comprise solution electrospinning or melt electrospinning. In the context of the present disclosure, the expression "solution electro spinning" may refer to a form of electrospinning where the core and shell components are prepared in the form of solutions. For example, the core and shell solutions may be polymeric solutions. As for "melt electrospinning", either one of the core or shell solution may be a melted liquid. For example, a polymer may be melted to form the core solution. In the case where monolithic fibers are solution electrospun, it means that a single monolithic solution is prepared instead of two solutions. Where monolithic fibers are melt electrospun, it means that the single monolithic solution is of a single monolithic melted liquid.

Referring back to coaxial electrospinning, the present method may further comprise a step of forming the shell solution by dissolving the hydrophobic polymer in a first organic solvent or melting the hydrophobic polymer.

The hydrophobic polymer may comprise poly(alpha-hydroxyesters), polycarbonates, polyurethanes or polyalkanoates. The poly(alpha-hydroxyesters) may be selected from the group consisting of of polylactic acid, poly-(l-lactide), poly-(d,l-lactide), poly(glycolic) acid, poly(lactide-co-glycoside acid), polycaprolactone, poly(p-dioxanone) and poly (lactide-co-trimethylene carbonate). The polyalkanoates may comprise poly(3-hydroxybutyrate). The hydrophobic polymer used to form the shell or shell solution may be different or same as the hydrophobic polymer matrix. To put it the other way, the hydrophobic polymer matrix may be composed of the same or different hydrophobic polymer of the shell or shell solution.

The first organic solvent may comprise a co-solvent system of chloroform and dimethylformamide (DMF), or hexafluoroisopropanol (HFIP) and dichloromethane. Co-solvent systems in the present disclosure refer to a solvent system composed of two solvents.

To carry out the coaxial electrospinning, the present method may further comprise a step of forming the core solution by dissolving the hydrophilic polymer in a second organic solvent or melting the hydrophilic polymer.

When forming the core solution, the hydrophilic particles may be added after dissolving the hydrophilic polymer in the second organic solvent or during melting of the hydrophilic polymer. The hydrophilic polymer may be selected from the group consisting of polyvinyl alcohol (PVA), polyvinylpyrrolidone (PVP), poly(acrylic acid) (PAA), polyethylene oxide (PEO) and polyethylene glycol (PEG). The second organic solvent may comprise a co-solvent system of water and ethanol. This co-solvent system results in better electrospinnability of the core and shell solutions. Ethanol helps to increase evaporation of solvent from the core solution during electrospinning while water improves conductivity of the co-solvent system which aids electrospinning.

In various embodiments relating to coaxial electrospinning, the solution electrospinning may be carried out by ejecting the shell solution and the core solution at a flow rate ratio of 2:1 to 4:1 or the melt electrospinning may be carried out by ejecting the shell solution and the core solution at a flow rate ratio of 2:1 to 4:1, to thereby form the core-shell fiber. The melt electrospinning may have a flow ratio of 3:1.

As mentioned above, the present disclosure also relates to embodiments where the hydrophobically modified particles may be produced in the form of monolithic fibers. Electrospinning may be utilized to produce monolithic fibers. However, this electrospinning is not coaxial electrospinning. It may be called monolithic electrospinning as the electrospinning of monolithic fibers utilizes one monolithic solution.

To produce monolithic fibers comprising the hydrophilic particles, the present method may comprise a step of forming a hydrophobic polymer solution by dissolving the hydrophobic polymer in a first organic solvent or melting the hydrophobic polymer. The first organic solvent or melting of the hydrophobic polymer may be the same as described above. In other words, the first organic solvent may comprise a co-solvent system of chloroform and dimethylformamide (DMF), or hexafluoroisopropanol (HFIP) and dichloromethane. Independently, the hydrophobic polymer used to form the hydrophobic polymer solution or the eventually electrospun monolithic fibers may be different or same as the hydrophobic polymer matrix. In other words, the hydrophobic polymer used to construct the monolithic fibers may be the same or different as the hydrophobic polymer matrix, and vice versa. Accordingly, the hydrophobic polymer may comprise poly(alpha-hydroxyesters), polycarbonates, polyurethanes or polyalkanoates. The poly(alpha-hydroxyesters) may be selected from the group consisting of polylactic acid, poly-(l-lactide), poly-(d,l-lactide), poly(glycolic) acid, poly(lactide-co-glycoside acid), polycaprolactone, poly(p-dioxanone) and poly(lactide-co-trimethylene carbonate). The polyalkanoates may comprise poly(3-hydroxybutyrate).

The hydrophilic particles embedded in the monolithic fibers may comprise or may be selected from the group consisting of barium sulphate, zirconia oxide, tantalum oxide and/or bismuth oxide. These hydrophilic particles may be added after dissolving the hydrophobic polymer in the first organic solvent or during melting of the hydrophobic polymer.

In general, the parameters for solution or melt electrospinning may depend on the polymers used, regardless of whether core-shell fibers or monolithic fibers are formed.

The hydrophilic particles used in the present disclosure may be composed of at least one metal oxide and/or at least one metal sulphate. That is to say, the hydrophilic particles may be hydrophilic metal oxide particles and/or hydrophilic metal sulphate particles. The hydrophilic particles may comprise or may be selected from the group consisting of barium sulphate, zirconia oxide, tantalum oxide and bismuth oxide. The hydrophilic particles may comprise hydrophilic barium sulphate particles or consist of barium sulphate particles.

After the hydrophobically modified particles are formed by the step of contacting the hydrophilic particles with the conjugating agent and functionalizing agent or the step of coaxial electrospinning or the step of monolithic electrospinning, they may be mixed with the hydrophobic polymer matrix. This may be done via a blending step. Accordingly, the hydrophobic polymeric composite of the present disclosure comprising of a polymer matrix and functionalized nano-sized or micro-sized fillers for medical devices application may be fabricated or blended in the following manner. The polymer and functionalized fillers may be processed by methods of compounding, for example, extrusion or batch compounding to form a composite blend. Once the blends are fabricated, regular processes such as melt press, extrusion, film casting and dip coating may be used to process the blends into different shapes such as tubes or fibers. In various embodiments, the polymer matrix and functionalized fillers may be added directly to a compounding and molding apparatus, for example, an extruder with mixing screws to ensure effective blending of the two components in the barrel before being extruded out. The compounder may be fitted with an appropriate die to effectively form the required device and geometry. The resulting composite material may undergo further processing such as laser cutting for stent fabrication to form the final medical device.

Having discussed the blending step in general, non-limiting exemplified embodiments of the various types of blending step that may be undertaken are as follows.

In several instances, the blending may be carried out by directly mixing (e.g. compounding) the hydrophobic polymer matrix with the hydrophobically modified particles, or by mixing the hydrophobically modified particles (e.g. those derived using organic moieties) with a hydrophobic polymer matrix solution. These blending steps may be preferably used to blend hydrophobically modified particles derived using organic moieties with the hydrophobic polymer matrix to obtain the hydrophobic polymeric composite. The direct mixing may be carried out by extrusion or batch compounding etc.

The hydrophobic polymer matrix and/or the hydrophobic polymer matrix solution may comprise or may be selected from the group consisting of poly(alpha-hydroxyesters), polycarbonates, polyurethanes or polyalkanoates. The poly(alpha-hydroxyesters) may be selected from the group consisting of of polylactic acid, poly-(l-lactide), poly-(d,l-lactide), poly(glycolic) acid, poly(lactide-co-glycoside acid), polycaprolactone, poly(p-dioxanone) and poly(lactide-co-trimethylene carbonate). The polyalkanoates may comprise poly(3-hydroxybutyrate). An organic solvent may be used to dissolve these polymers to form the hydrophobic polymer matrix solution. Such an organic solvent may include, but is not limited to, acetone.

The hydrophobic polymer matrix solution comprising the mixed hydrophobically modified particles may be casted on a substrate and then allowed to evaporate at 20° C. to 40° C., or even 25° C., for up to 24 hours to form the hydrophobic polymeric composite. The substrate may comprise a glass surface.

In several other instances, the blending may be carried out by mixing the hydrophobically modified particles (e.g. core-shell fibers) with a solution formed by dissolving the hydrophobic polymer matrix in a third organic solvent which does not dissolve the hydrophobic polymer used to form the shell solution (or the shell) to thereby form a suspension. This type of blending step may be preferably used to blend hydrophobically modified particles in the form of core-shell fibers with the hydrophobic polymer matrix to obtain the hydrophobic polymeric composite. The third organic solvent may comprise acetone.

The suspension may then be casted on a substrate and then allowed to evaporate at room temperatures of 20° C. to 40° C. for up to 24 hours. For instance, the evaporation may be at 25° C. for up to 24 hours. The substrate may comprise a glass surface. The glass surface may be of a glass petri dish.

The hydrophobic polymer matrix utilized in this type of blending step, particularly blending with core-shell fibers, may comprise or may be composed of a different hydrophobic polymer from the shell or shell solution. The hydrophobic polymer matrix may comprise poly(alpha-hydroxyesters), polycarbonates, polyurethanes or polyalkanoates. The poly(alpha-hydroxyesters) may be selected from the group consisting of polylactic acid, poly-(l-lactide), poly-(d,l-lactide), poly(glycolic) acid, poly(lactide-co-glycoside acid), polycaprolactone, poly(p-dioxanone) and poly(lactide-co-trimethylene carbonate). The polyalkanoates may comprise poly(3-hydroxybutyrate).

Another type of blending may be carried out by mixing the hydrophobically modified particles (e.g. monolithic fibers) with a solution formed by dissolving the hydrophobic polymer matrix in a third organic solvent which does not dissolve the hydrophobic polymer used to form the hydrophobic polymer solution (for electrospinning monolithic fibers) to thereby form a suspension. This type of blending step may be preferably used to blend hydrophobically modified particles in the form of monolithic fibers with the hydrophobic polymer matrix to obtain the hydrophobic polymeric composite. The third organic solvent may comprise acetone.

The suspension may then be casted on a substrate and then allowed to evaporate at room temperatures of 20° C. to 40° C. for up to 24 hours. For instance, the evaporation may be at 25° C. for up to 24 hours. The substrate may comprise a glass surface. The glass surface may be of a glass petri dish.

The hydrophobic polymer matrix utilized in this type of blending step, particularly blending with monolithic fibers, may comprise or may be composed of a different hydrophobic polymer from the monolithic fiber or the hydrophobic polymer solution used to electrospin the monolithic fiber. The hydrophobic polymer matrix may comprise poly(alpha-hydroxyesters), polycarbonates, polyurethanes or polyalkanoates. The poly(alpha-hydroxyesters) may be selected from the group consisting of polylactic acid, poly-(l-lactide), poly-(d,l-lactide), poly(glycolic) acid, poly(lactide-co-glycoside acid), polycaprolactone, poly(p-dioxanone) and poly (lactide-co-trimethylene carbonate). The polyalkanoates may comprise poly(3-hydroxybutyrate).

As mentioned above, there may be two types of blending steps which involve the third organic solvent. These two types of blending steps may be preferably used to blend the core-shell fibers or monolithic fibers with the hydrophobic polymer matrix. In these instances and as disclosed above, the hydrophobic polymer matrix comprises a different hydrophobic polymer from the shell or shell solution, and the monolithic fiber. This means that in such instances, the hydrophobic polymer of the hydrophobic polymer matrix cannot be identical to the hydrophobic polymer used to make the shell or shell solution, and the monolithic fiber or hydrophobic polymer solution used for monolithic electrospinning. This is because when the same hydrophobic polymers are used, the third organic solvent used for dissolving the hydrophobic polymer matrix may undesirably cause dissolution of the shell or the monolithic fibers, thereby destroying the earlier efforts taken to functionalize or modify the hydrophilic particles. Accordingly, when different hydrophobic polymers are used, this helps to avoid the third organic solvent causing undesirable dissolution of the shell of core-shell fibers and the monolithic fibers. Another consideration for these two types of blending steps may be that even if different hydrophobic polymers are used, the third organic solvent must not dissolve the shell and the monolithic fibers.

Having discussed the various types of blending step, the present method may further comprise a step of annealing the hydrophobic polymeric composite. The annealing may be carried out at a temperature of 70° C. to 140° C. for up to 24 hours. The step of annealing may be applied to embodiments where the hydrophobically modified particles are derived from the organic moiety, or the core-shell fibers or the monolithic fibers.

Biodegradable implantable biomedical devices for load-bearing applications including but not limited to stents, heart occluders, and orthopedic devices may be fabricated from the composite polymeric material described with enhanced mechanical properties compared to biodegradable polymeric devices without the addition of the non-functionalized and functionalized fillers. Specifically, in the case of coronary stents, the various embodiments may use a weight percentage of functionalized nano or micro fillers between 5% and 40% to reinforce biodegradable polymers. The functionalization may improve the filler-polymer affinity which may ensure good dispersion of the fillers in the polymer matrix and improve interfacial adhesion between the fillers and polymer. The composite containing the polymer and functionalized fillers may allow an increase in tensile modulus, strength and elongation at break, thereby reducing the strut thickness of stents manufactured from these materials.

In summary, the present disclosure relates to a biodegradable polymer composite material which may comprise a fully biodegradable polymer and functionalized nano-sized or micro-sized fillers, which exhibits enhanced mechanical properties such as higher tensile modulus and improved elongation at break. While the addition of fillers may reinforce the polymer and thereby increase its mechanical properties, good interaction between the hydrophilic fillers and the hydrophobic host matrix may have to be first established. The above discusses two ways to improve the dispersion of these nano or micro fillers in a polymeric environment. These two ways may be to (1) decrease the hydrophilicity of the fillers and/or (2) increase the affinity of the fillers to the hydrophobic polymer used to form the matrix.

For the first way, a method to decrease the hydrophilicity of the nano or micro fillers may be by chemical functionalization briefly described as follows. The chemical functionalization of the particles serves to establish targeted interactions between the fillers and the polymer, and enables sufficient filler-filler repulsion, both of which may aid in enhancing the mechanical properties of the composite. Chemical functionalization may be achieved by employing a bi-functional organic compound, i.e. made up of a conjugating agent and a desired functional group, as a chemical linker between the fillers and the polymer.

For the second way, an approach to increase the affinity of the fillers to the polymers may be achieved by physically incorporating the fillers into a more compatible platform before addition to the polymers. The platform may be compatible due to it having the same or similar chemical structure as the polymer and/or it being hydrophobic in nature, both of which may serve to improve the interactions between the fillers and polymer matrix.

With these two ways, it is possible to attain a class of composite materials comprising of biodegradable polymers and functionalized fillers for medical device applications in which the biodegradable nature of the polymers may be capitalized while the material strength may be enhanced using the functionalized fillers as disclosed herein. Embodiments of the present disclosure may include different approaches to fabricating the composite material and methods to produce a stent.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present invention relates to the field of biomedical materials and in particular, to biodegradable polymer composite materials with functionalized nano-sized or micro-sized fillers and its preparation method. The present invention further relates to a biodegradable polymer composite material comprising of a fully biodegradable polymer and functionalized nano-sized or micro-sized fillers, which exhibit enhanced mechanical properties such as higher tensile strength and improved elongation at break. The invention also relates to methods of manufacturing such composite materials.

Example 1

Detailed Summary of the Present Method—Solution Electrospinning

The present disclosure provides a method to fabricate composite materials comprising of a biodegradable polymer and functionalized nano or micro fillers. Functionalization of the fillers is achieved by chemically conjugating compatible functional groups to the surface of nanoparticles and/or physically incorporating the fillers in a compatible platform. In accordance with the definition provided above and in the context of the following examples, the term "functionalization" may refer to modifying the hydrophilicity of the fillers via the method as disclosed herein whereas the expression "chemical functionalization" refers to various instances as described herein where a hydrophilic filler may be modified by chemically conjugating it with a functional group that may be compatible with a hydrophobic polymer matrix. Functionalization, including chemical functionalization, improves interfacial adhesion of the hydrophilic fillers to the hydrophobic polymeric environment, thereby enhancing the mechanical properties of the polymers for use in fabricating implantable medical devices.

A method of incorporating or dispersing the hydrophilic fillers in a compatible platform is coaxial electrospinning of two immiscible polymeric solutions to produce core-shell fibers as illustrated in FIG. 1A. The coaxial electrospinning set up 10 includes a hydrophobic shell solution 11, a hydrophilic core solution 12, a voltage source 13 and a collector 14. The resultant core-shell fibers 15 were spun onto the collector 14. Hydrophilic nanoparticles were added to the hydrophilic core solution 12 and electrospun with the shell solution 11.

Figure 1B:
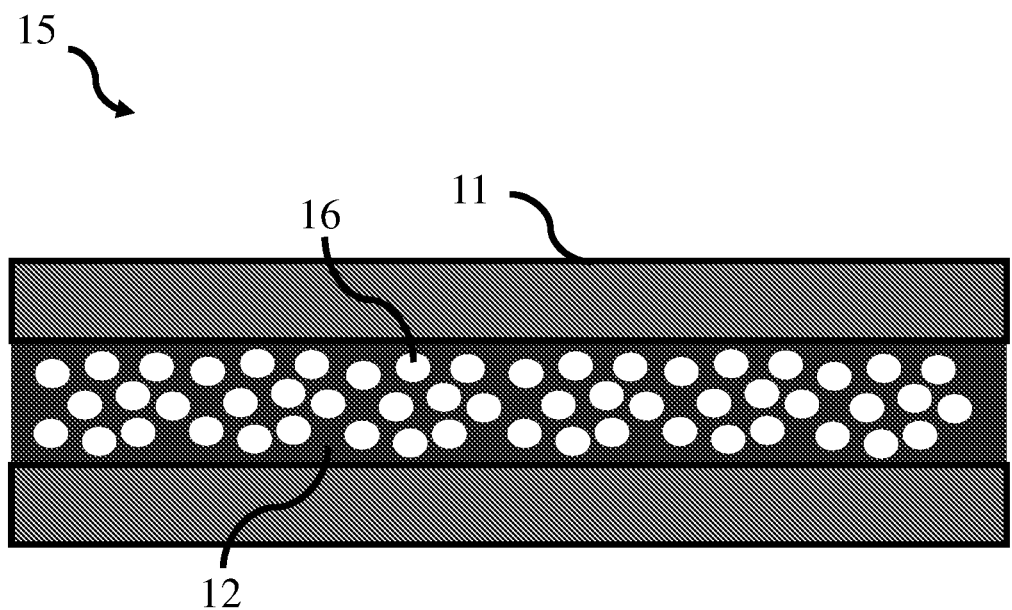
FIG. 1B illustrates a schematic diagram of the bi-component core-shell fibers formed from the process depicted in FIG. 1A.

The core-shell fibers 15 as shown in FIG. 1B had a compatible hydrophobic shell 11 and the hydrophilic nanoparticles 16 were encapsulated in the hydrophilic core 12. The choice of the shell or shell solution 11 can be made from the same or different polymer (i.e. hydrophobic) as that of the hydrophobic polymer matrix. The core or core solution 12 which the nanoparticles were added to can comprise any hydrophilic polymer capable of being coaxially electrospun with the shell solution 11.

This platform provides a way for the hydrophilic nanoparticles to be "shielded" from the hydrophobic polymeric environment (thereby improving adhesion between the two components) and allows the fillers (i.e. the resultant hydrophobically modified particles) to be added into the system, thereby reinforcing the hydrophobic polymer matrix and improving the mechanical properties of the hydrophobic polymeric composite.

Example 2

Detailed Summary of the Present Method—Melt Electrospinning

Another way of the present method to incorporate or disperse the hydrophilic fillers in a compatible platform is coaxial melt electrospinning. In this way, the nanoparticles were first added to the melt of a hydrophilic polymer to produce a core melt solution. The shell component can be made from a polymeric melt solution. The two solutions were then fed to the coaxial spinneret and voltage was applied to electrospin the melt solutions.

The polymers for melt electrospinning can be heated by different means such as heating oven, heat guns, laser melting devices and electric heating. The core polymeric material (in both melt and solid states) should be immiscible with the shell polymeric solution in order to obtain core-shell fibers encapsulating the hydrophilic fillers.

Example 3

Detailed Summary of the Present Method—Chemical Functionalization

The present method may also include a way to increase affinity of the fillers to the hydrophobic polymer matrix by chemical functionalization. Chemical functionalization of particles or nanoparticles serves to (1) establish targeted interactions between the fillers 16 and the hydrophobic polymer matrix and (2) cause sufficient filler-filler repulsion, both of which aid in enhancing the mechanical properties of the resultant composite.

Figure 2A:
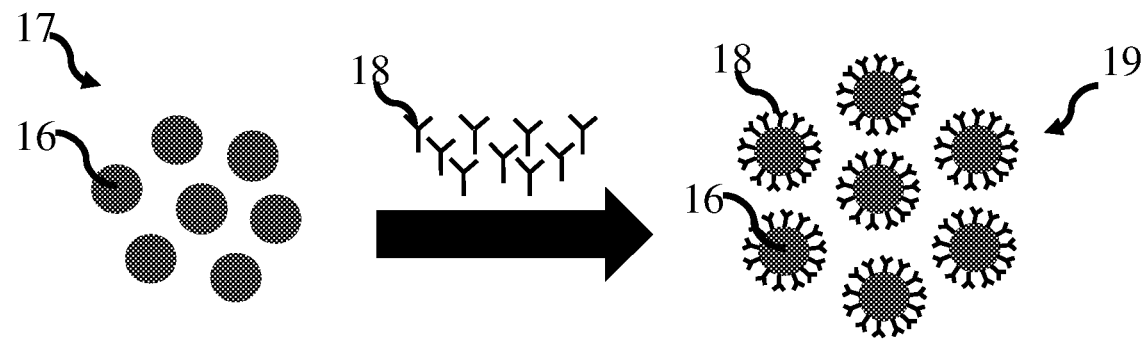
FIG. 2A illustrates the first step of a two-step chemical functionalization process in which suitable conjugating agent(s) are used to covalently bind the required functional groups to the nanoparticles or fillers. This first step shows a surface conjugation step where conjugating agents are attached to nanoparticles or fillers.
Figure 2B:
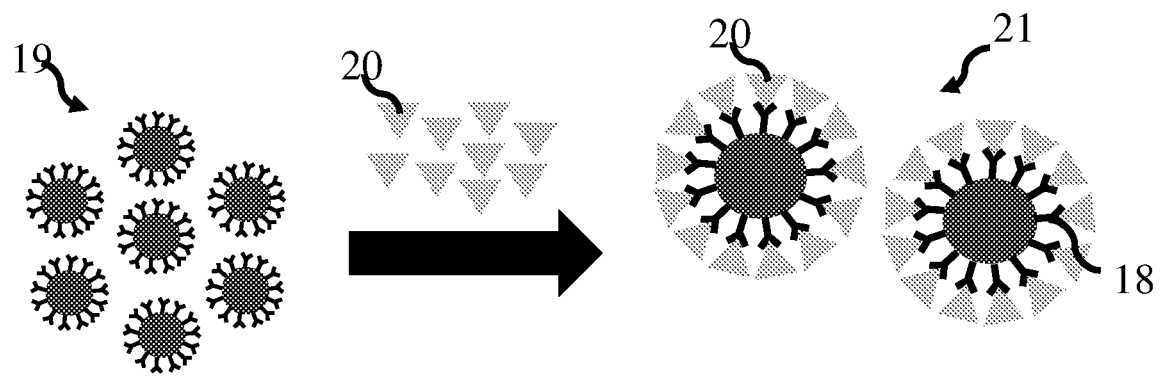
FIG. 2B illustrates the second step of a two-step chemical functionalization process in which suitable conjugating agent(s) are used to covalently bind the required functional groups to the nanoparticles or fillers. This second step shows a group of compounds comprising the required functional group(s) attached to the conjugated nanoparticles or fillers.

Chemical functionalization (FIG. 2A and FIG. 2B) was achieved by employing a bi-functional organic compound (made up of a conjugating agent and the desired functional group) as a chemical linker between the hydrophilic fillers and the hydrophobic polymer in a two-step approach. Firstly, a surface conjugation step 17 was done whereby a conjugating agent 18 was chemically attached to the surface of hydrophilic filler(s) 16 to form a conjugated nanoparticle complex 19. The hydrophilic filler(s) 16 in FIG. 2A are not the resultant hydrophobically modified fillers. After conjugation step 17, another group 20 containing the required active functionality or functional group was added to the conjugated complex 19 and the resultant nanoparticles or fillers 21 acquired the functional groups. The amount of conjugating agent 18 and chemical compound of group 20 used to functionalize the hydrophilic nanoparticles 16 can add up to 1 to 5% of the total weight of the resultant functionalized nanoparticles 21. The resultant functionalized nanoparticles 21 now possess the required surface functional groups to establish targeted interactions between the nanoparticles and the polymer matrix, and enhance the mechanical properties of the composite material.

Figure 3A:
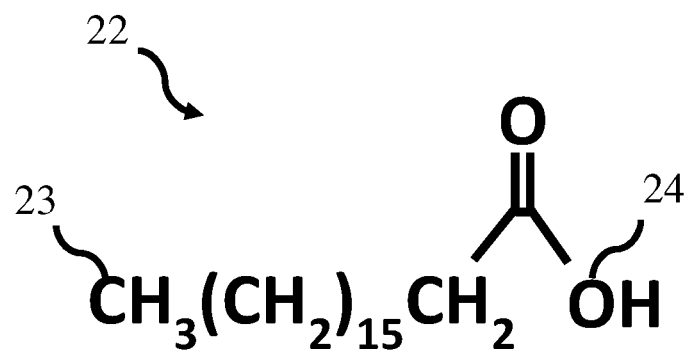
FIG. 3A shows the chemical structure of stearic acid (SA).
Figure 3B:
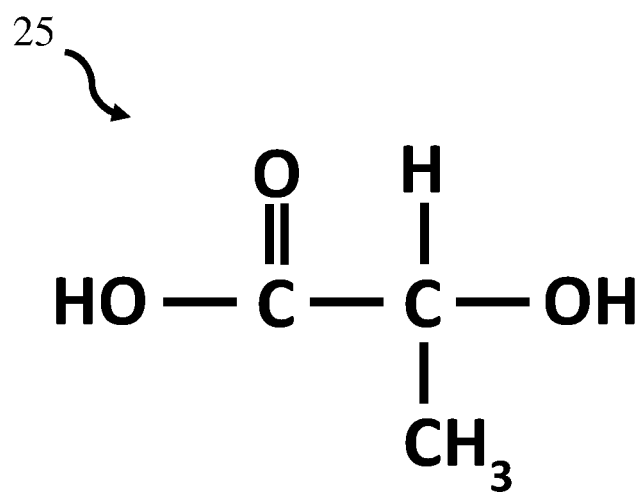
FIG. 3B shows the chemical structure of a L-lactic acid (which may be abbreviated as L-LA, LLA or LA in the present disclosure) monomer.

The required active functionality can be functional groups that interact favourably with a hydrophobic polymeric environment since the nanoparticles are to be dispersed in a hydrophobic polymer matrix. Suitable chemical compounds having such functionality include, but are not limited to, surfactants having hydrocarbon chains (one or more alkyl chains or groups with 3 to 30 carbon atoms) to confer hydrophobicity, and/or the oligomers or monomers of the host polymer (i.e. hydrophobic polymer matrix) that can interact favourably with the various components that form the resultant composite (which would include the hydrophobically modified particles and the polymers used for the hydrophobic polymer matrix). One of the possible chemical compounds to be conjugated with the nanoparticles can be stearic acid 22 which is a surfactant with a bifunctional character (FIG. 3A). Any suitable coupling agent can be used to attach the stearic acid to the hydrophilic nanoparticles. The long hydrocarbon chains 23 are able to interact favourably in a hydrophobic environment while the polar head group 24 can be attached to metal cations. Another chemical compound can be the monomer of L-lactic acid 25 (FIG. 3B) for functionalizing nanoparticles to improve mechanical properties of PLLA. A suitable conjugating agent (i.e. coupling agent) which can be used to link both the nanoparticles and the compound having the desired functional group(s) was used in this example. The conjugating agents may include but are not limited to silane coupling agents such as (3-mercaptopropyl)trimethoxysilane, titanate coupling agents, aluminate coupling agents, double metal coupling agents, borate coupling agents and rare earth coupling agents.

Example 4

Detailed Summary of the Hydrophobic Polymeric Composite

This example describes a biodegradable polymer composite material comprising a fully biodegradable polymer and functionalized nano-sized or micro-sized fillers. The composite material exhibits enhanced mechanical properties such as higher tensile strength and improved elongation at break.

Figure 4A:
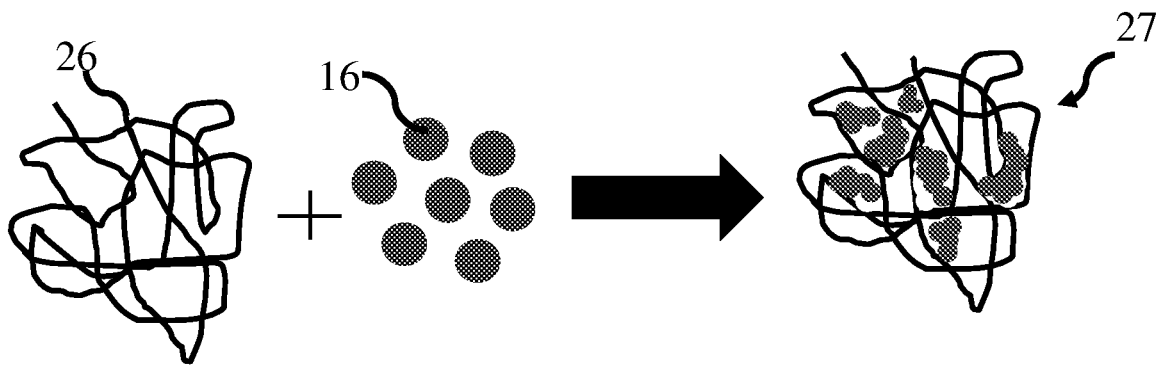
FIG. 4A illustrates the interactions of a polymer matrix with non-functionalized fillers. Specifically.
Figure 4B:
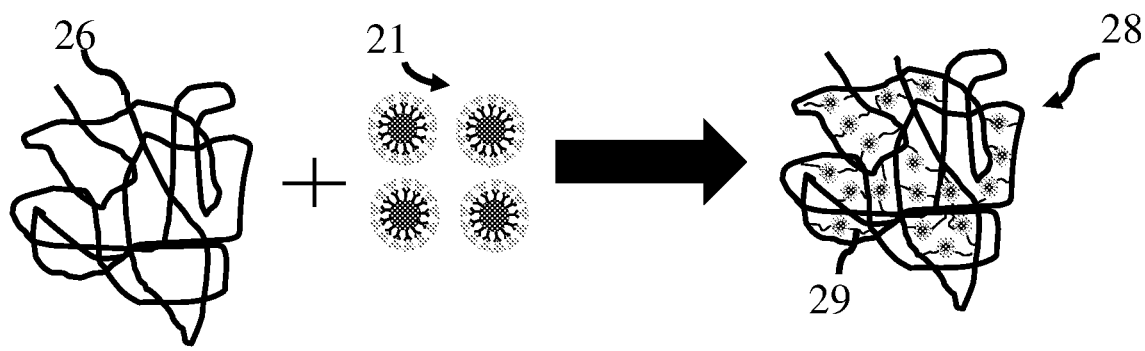
FIG. 4B illustrates the interactions of a polymer matrix with functionalized fillers. Specifically.
Figure 4C:
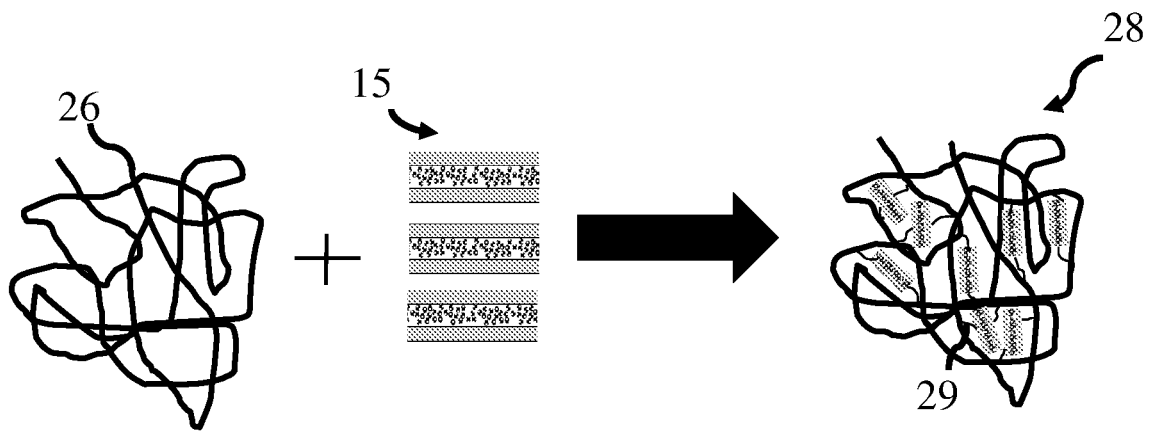
FIG. 4C illustrates the interactions of a polymer matrix with functionalized fillers. Specifically.

As illustrated in FIG. 4A, when non-functionalized hydrophilic fillers 16 are blended with a hydrophobic polymer 26, the fillers agglomerate 27 due to weak polymer-filler affinity. There was no establishment of helpful interactions between the fillers 16 and the hydrophobic polymer 26 due to the difference in their nature. However, when functionalized nanoparticles 21 (e.g. chemically functionalized nanoparticles in FIG. 4B) or nanoparticles encapsulated in a compatible platform 15 (e.g. nanoparticles in core of core-shell fibers in FIG. 4C) were added to the polymer, composite materials with enhanced mechanical properties 28 were formed due to the targeted interactions 29 between the host matrix and fillers (FIG. 4B and FIG. 4C). The functionalization of the nano-sized or micro-sized fillers aids in uniform dispersion of fillers within the polymer matrix and improves the polymer-filler affinity.

Example 5

Fabrication of Electrospun Core-Shell Fibers with Encapsulated $BaSO_4$

A hydrophilic core polymeric solution was prepared by dissolving PEO (molecular weight=600 kDa) pellets in a co-solvent system of water/ethanol to form a 5 wt % solution. When the polymer was fully dissolved, $BaSO_4$ nanoparticles (with an average size of 20 nm) were added to the 5% PEO solution such that the nanoparticles were 15 wt % with respect to PEO. The shell polymeric solution was prepared by dissolving PLLA pellets in a co-solvent system of chloroform/dimethylformamide (DMF) to form a 12 wt % solution. The two polymeric solutions were then added to the coaxial spinneret. A voltage between 18 kV to 25 kV was employed and the solutions were electrospun into core-shell fibers. During the electrospinning process, the flow rates of the shell and core solutions were kept at a ratio of 4:1. As the two solutions were spun, evaporation of the organic solvents occurred and dried fibers were collected on a rotating mandrel. The resultant functionalized fiber system consisted of a PLLA shell and a PEO core encapsulating $BaSO_4$ particles. The average diameter of the fibers was about 2 μm.

Example 6

Fabrication of Melt Core-Shell Fibers with Encapsulated $BaSO_4$

A core polymeric solution consisting of PEG (molecular weight=10 kDa) and $BaSO_4$ nanoparticles (with an average size of 20 nm) was prepared by melting the polymer at 70° C. (melting point of PEG=60° C.) while mixing in the nanoparticles on a thermal magnetic stirrer. The shell solution was prepared by melting PCL pellets at the same temperature (melting point of PCL=60° C.). The polymeric solutions were added to an insulated coaxial spinneret set up and the temperature of the spinning process was kept above 60° C. throughout. The flow rates of the shell and core solutions were kept at a constant ratio of 3:1 and the melt spun fibers were collected on a rotating mandrel. The resultant functionalized fiber system consisted of a PCL shell and a PEG core encapsulating $BaSO_4$ particles. The average diameter of the fibers was about 15 μm.

Example 7

Composite Consisting of PLLA and Core-Shell Fibers with Encapsulated $BaSO_4$ The electrospun PLLA shell and PEO/$BaSO_4$ core bi-component fibers fabricated in example 5 were chopped into smaller fragments to be used as fillers. PCL pellets were first dissolved in acetone with magnetic stirring at 40° C. to aid the dissolution of PCL to form 5 wt % polymeric solution. After the PCL dissolved, the core-shell fibers were added to the solution such that the fillers were 15 wt % with respect to PCL. The composite material was prepared by casting the PCL/core-shell fibers solution onto a glass petri dish which was covered with a lid and placed in a fume hood at room temperature for slow evaporation. The dried film was collected and further vacuum dried for 48 hours. The choice of acetone as a solvent is important as the solvent should be one that is able to dissolve the hydrophobic polymer matrix but not the hydrophobic shell of the bi-component fibers. This ensures the "shielding" effect of the core-shell fibers remains.

Example 8

Composite Material Consisting of PLLA and $BaSO_4$ Nanoparticles Functionalized with Stearic Acid Stearic acid (FIG. 3A) was chemically conjugated to $BaSO_4$ nanoparticles via aluminate coupling agents. The coupling agent and stearic acid form 1% of the total weight of the functionalized nanoparticles. The average diameter of the chemically functionalized nanoparticles is about 30 nm to 60 nm. The functionalized nanoparticles in powder form were added directly to and blended with PLLA using a compounder. The temperature of the compounder was set between 190° C. and 210° C. to melt the PLLA and a twin screw system was used to mix the two components for about 10 minutes. The blended melt solution was extruded using a fiber die to produce the composite material in fiber form with an average diameter of 200 μm. Mechanical properties of the composite PLLA/$BaSO_4$-stearic acid fibers were tested using a MTS tensile tester. Pure PLLA fibers and PLLA/$BaSO_4$ fibers were also fabricated and tested using the same method to serve as a point of reference and control, respectively.

Example 9

Discussion on Results of Example 8

Figure 5:
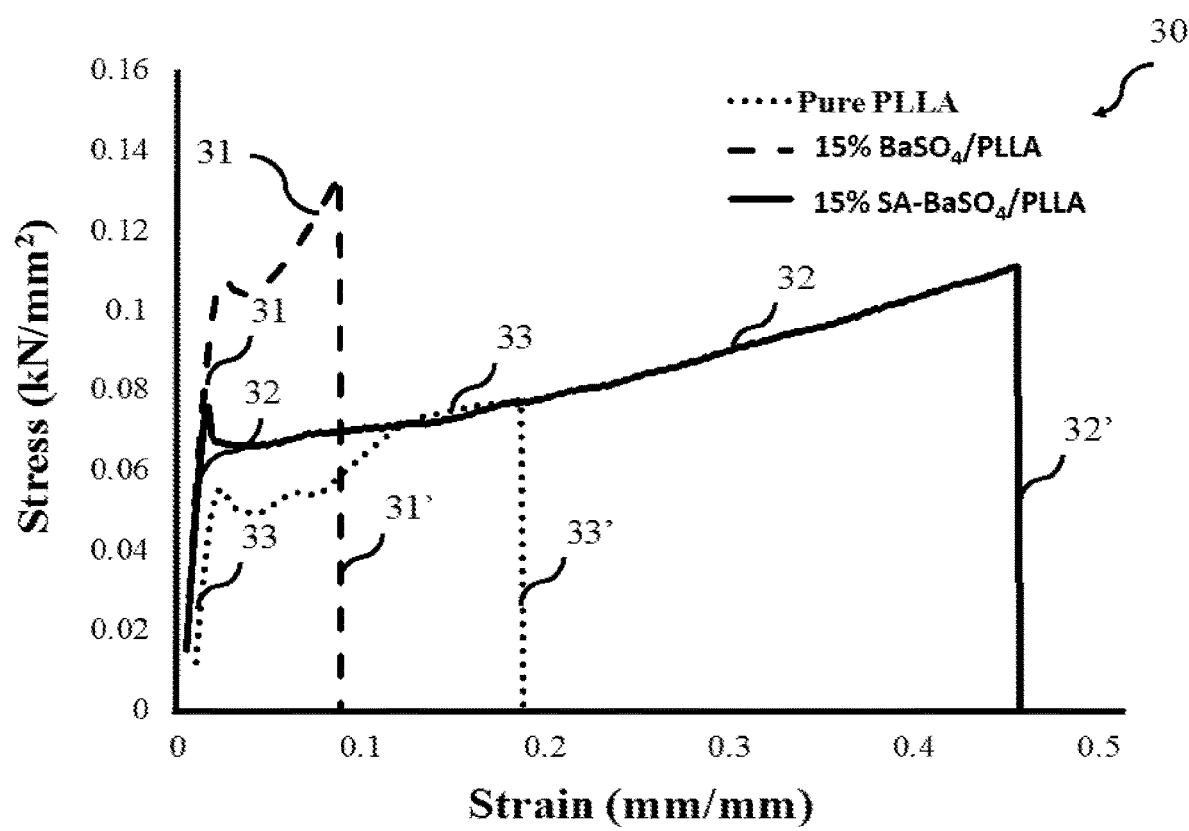
FIG. 5 is a stress-strain plot of composite samples fabricated by microcompounding poly(L-lactide) (PLLA) (also called poly(L-lactic acid) in the present disclosure) with non-functionalized barium sulfate ($BaSO_4$) and SA-functionalized $BaSO_4$ (SA-$BaSO_4$)nanoparticles.
Figure 6A:
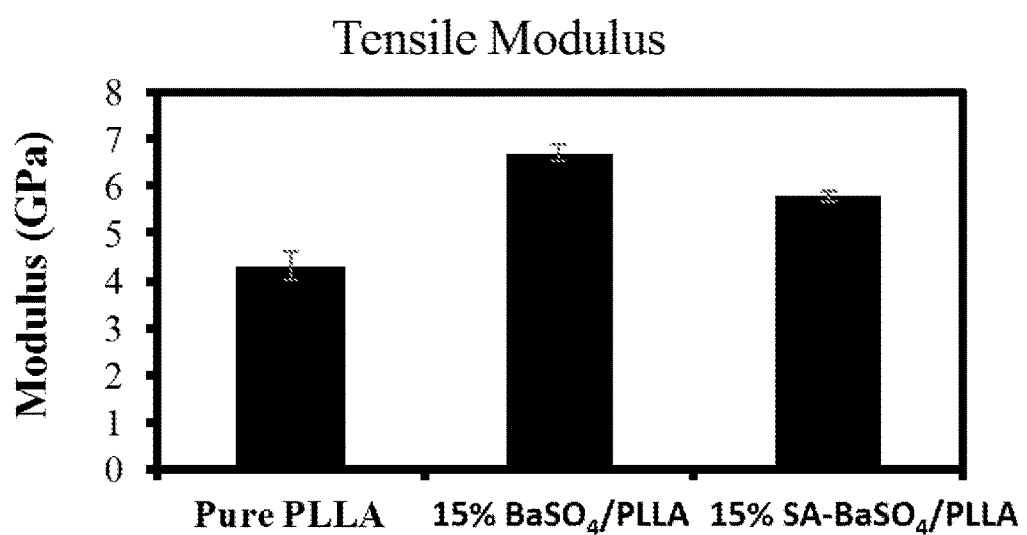
FIG. 6A is a graph depicting tensile modulus for microcompounded PLLA, $BaSO_4$/PLLA and SA-$BaSO_4$/PLLA composite samples.
Figure 6B:
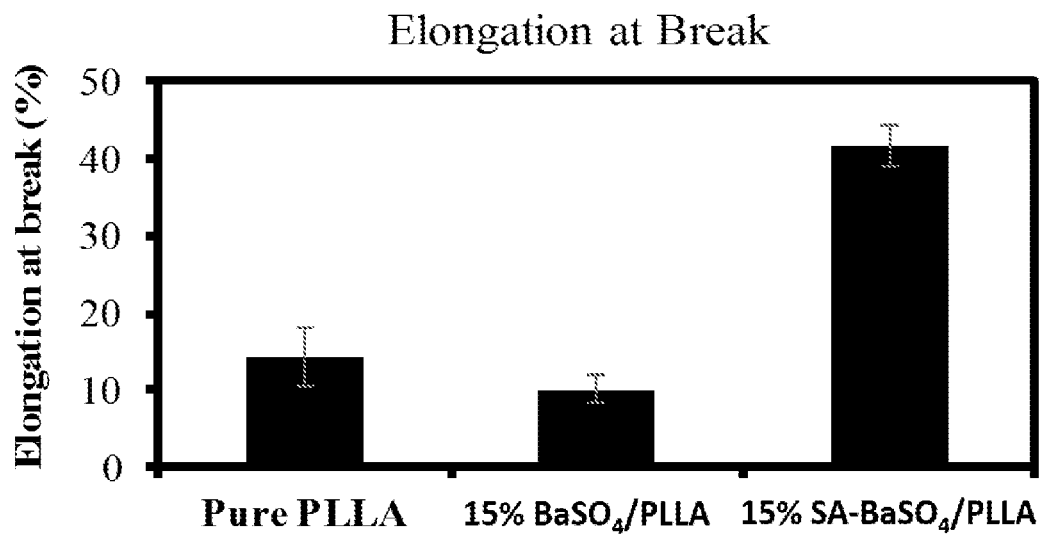
FIG. 6B is a graph depicting elongation at break for microcompounded PLLA, $BaSO_4$/PLLA and SA-$BaSO_4$/PLLA composite samples.

The stress-strain curves of different samples derived from example 8 were recorded, and the tensile modulus and elongation at break can be obtained from the curves in FIG. 5. As shown in plot 30, the stress-strain curves generated by non-functionalized $BaSO_4$/PLLA 31, stearic acid-functionalized $BaSO_4$/PLLA 32 and pure PLLA 33 differed in their mode of failure. Pure PLLA 33' and non-functionalized $BaSO_4$/PLLA 31' displayed relatively brittle failure mode but the functionalized BaSO$_4$/PLLA had a greater region of plastic failure 32', indicating good ductility. The tensile moduli of the 3 samples were also plotted (FIG. 6A) and the elongation at break were obtained (FIG. 6B). With the addition of 15 wt % of functionalized SA-BaSO$_4$ (wherein the wt % is based on the resultant composite), the composite attained a 34% increase in tensile modulus compared to pure PLLA while being comparable to the non-functionalized BaSO$_4$/PLLA composite. It can be seen from FIG. 6B that functionalization greatly improved the composite's elongation at break by 190% and 220% compared to pure PLLA and non-functionalized BaSO$_4$/PLLA samples, respectively. The results demonstrated positive effect of using functionalized nanoparticles to enhance mechanical strength of PLLA.

Example 10

Effects of Different Nanofillers Size
(Non-Functionalized Fillers)

Figure 7A:
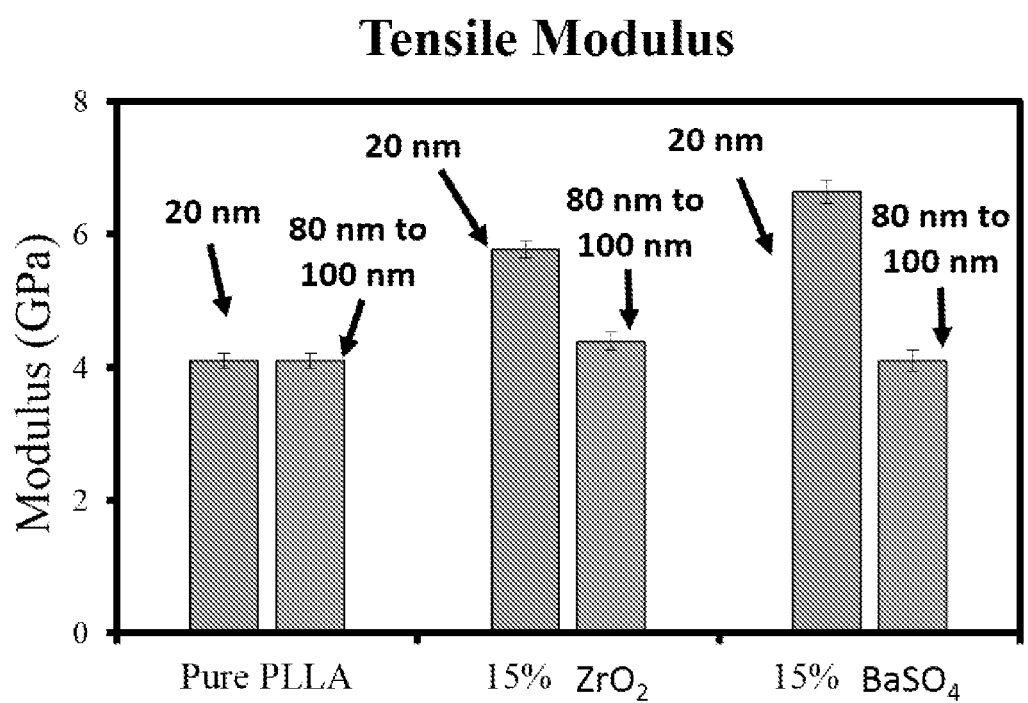
FIG. 7A shows the effect of different nanofillers and their size on tensile modulus of the resultant composite.
Figure 7B:
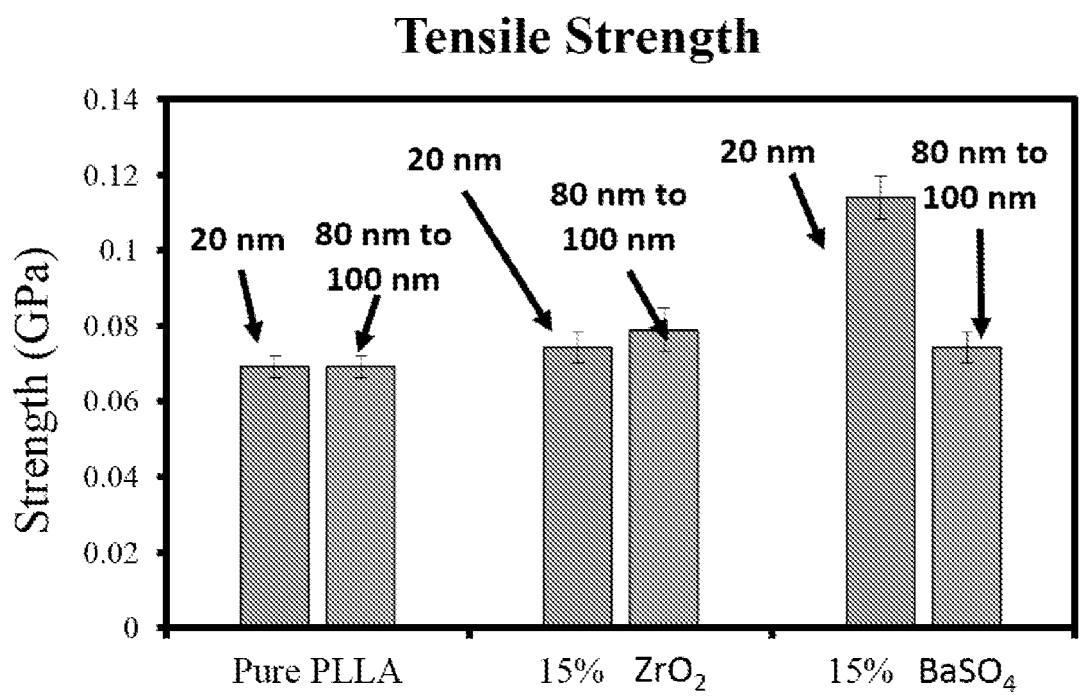
FIG. 7B shows the effect of different nanofillers and their size on tensile strength of the resultant composite.

FIG. 7A and FIG. 7B show the effects of tensile modulus and tensile strength for different nanofiller sizes, respectively. It can be seen that both modulus and strength are significantly higher for BaSO$_4$ especially at 20 nm. Although not shown, elongation at break had no significant difference between the ZrO$_2$ and BaSO$_4$ nanofillers at any size. These nanofillers were non-functionalized, which is to say, the ZrO$_2$ and BaSO$_4$ particles were not hydrophobically modified. The 15% is a wt % based on weight of resultant composite.

Example 11

Effects of Functional Groups

Non-functionalized fillers with aluminate coupling agents (i.e. the fillers or hydrophilic particles which are not hydrophobically modified) demonstrated highest increase in tensile modulus, which may be a reinforcement property of nanoparticles, and a significant decrease in elongation at break for PLLA (i.e. composite material becomes very stiff).

Figure 8:
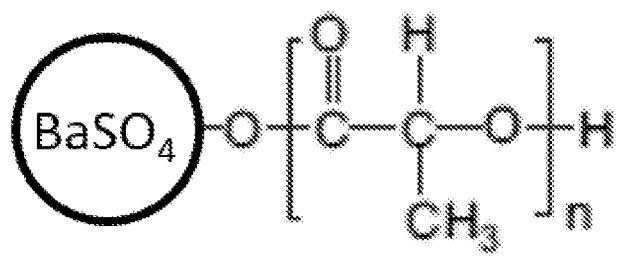
FIG. 8 shows a chemical formula of L-lactic acid-$BaSO_4$ (also called L-lactide-$BaSO_4$) as a choice of filler.

When stearic acid (FIG. 3A) is used as the surfactant, smaller increase in tensile modulus and strength with very large increase in elongation at break was observed. Meanwhile, L-lactic acid-functionalized BaSO$_4$/PLLA system had higher increase in tensile modulus and strength compared to stearic acid-functionalized BaSO$_4$/PLLA. This may be because hydrophobic L-lactic acid (FIG. 8 shows L-lactic acid coupled to BaSO$_4$) has a longer chain length than stearic acid while stearic acid has a lubricating effect.

Example 12

Image Characterization of Composites Based on BaSO$_4$

Figure 9A:
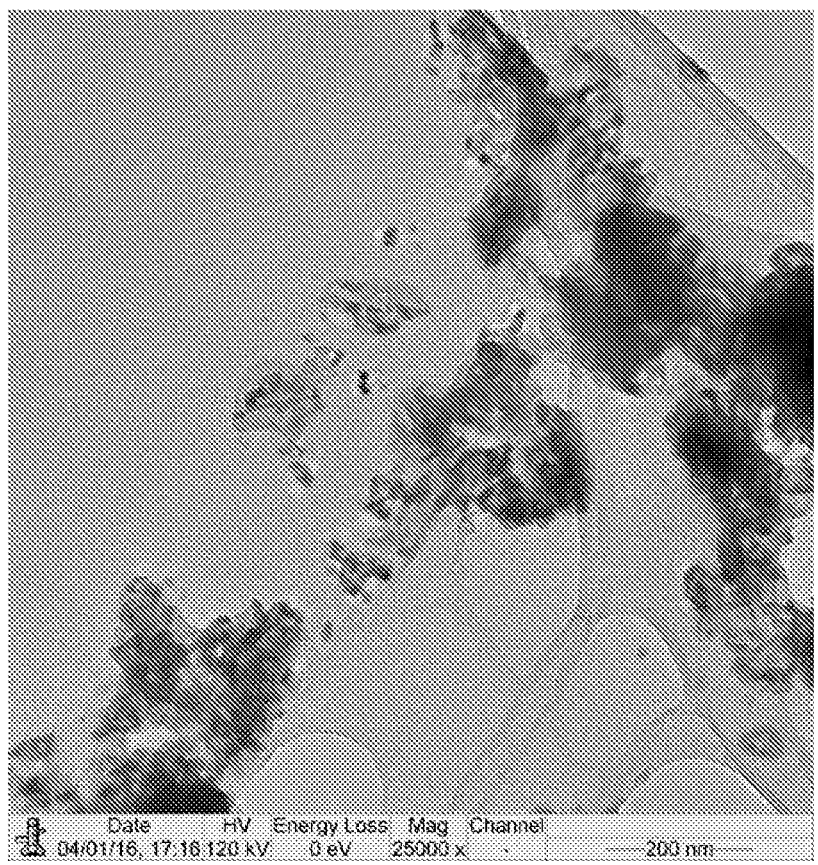
FIG. 9A shows a transmission electron microscopy (TEM) image of $BaSO_4$/PLLA nanoparticles with an average size of 20 nm. The magnification is ×25000 and the scale bar is 200 nm.
Figure 9B:
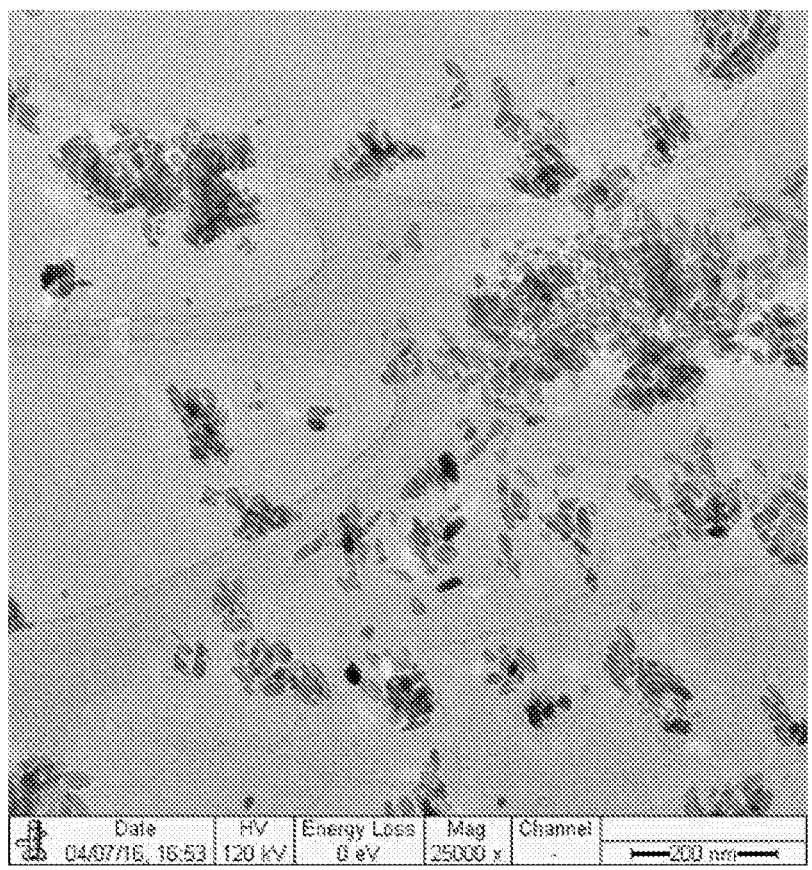
FIG. 9B shows a TEM image of SA-$BaSO_4$/PLLA nanoparticles with an average size of 26 nm. The magnification is ×25000 and the scale bar is 200 nm.
Figure 9C:
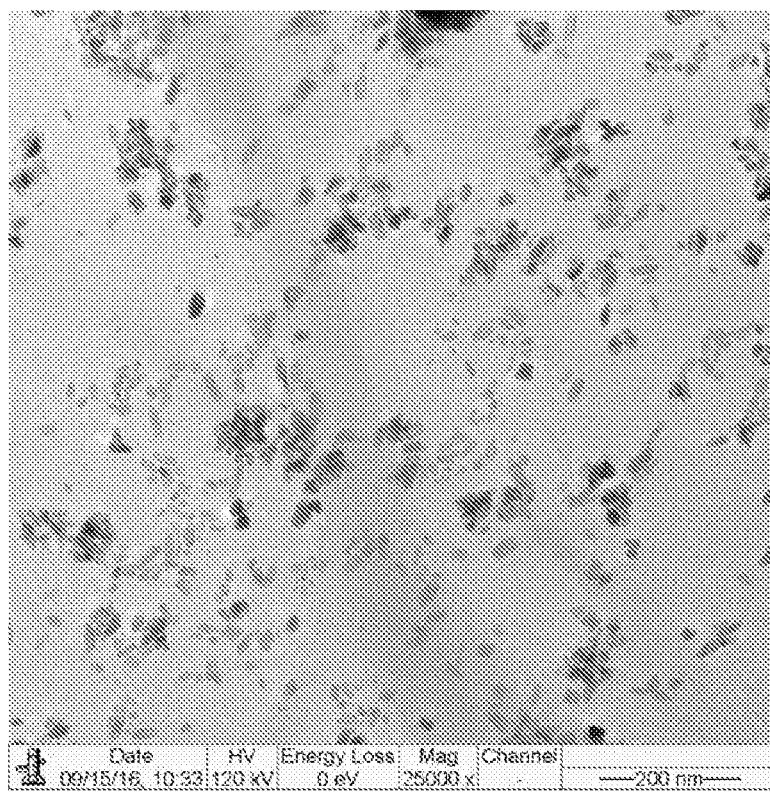
FIG. 9C shows a TEM image of L-lactic acid-$BaSO_4$/PLLA nanoparticles with an average size of 23 nm. The magnification is ×25000 and the scale bar is 200 nm.

The transmission electron microscopy (TEM) images of BaSO$_4$/PLLA, stearic acid (SA) with BaSO$_4$/PLLA, and L-lactic acid with BaSO$_4$/PLLA are shown in FIG. 9A to FIG. 9C, respectively. The average nanoparticle diameter are 20 nm, 26 nm and 23 nm, respectively. These are derived from chemically functionalized BaSO$_4$ fillers with aluminate coupling agents.

Example 13

Figure 10A:
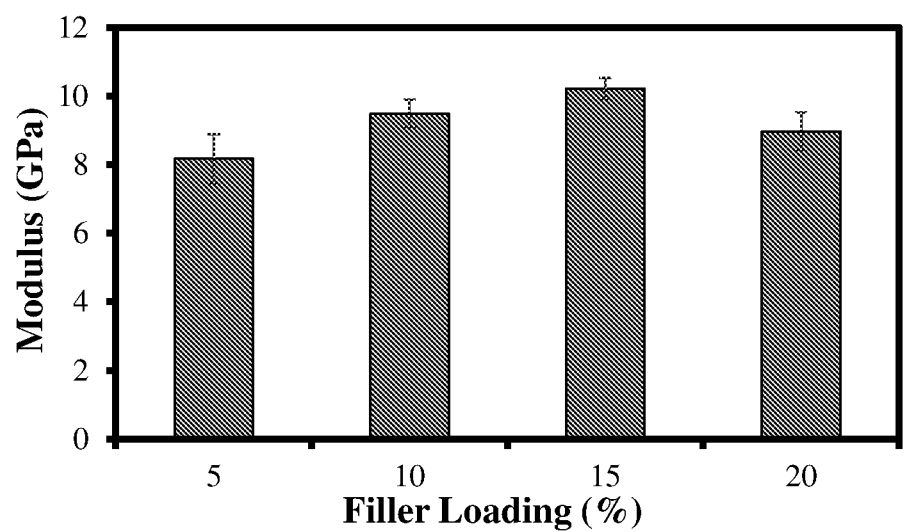
FIG. 10A is a graph showing the effect of different L-lactic acid-$BaSO_4$/PLLA loadings on tensile modulus of the resultant composite.
Figure 10B:
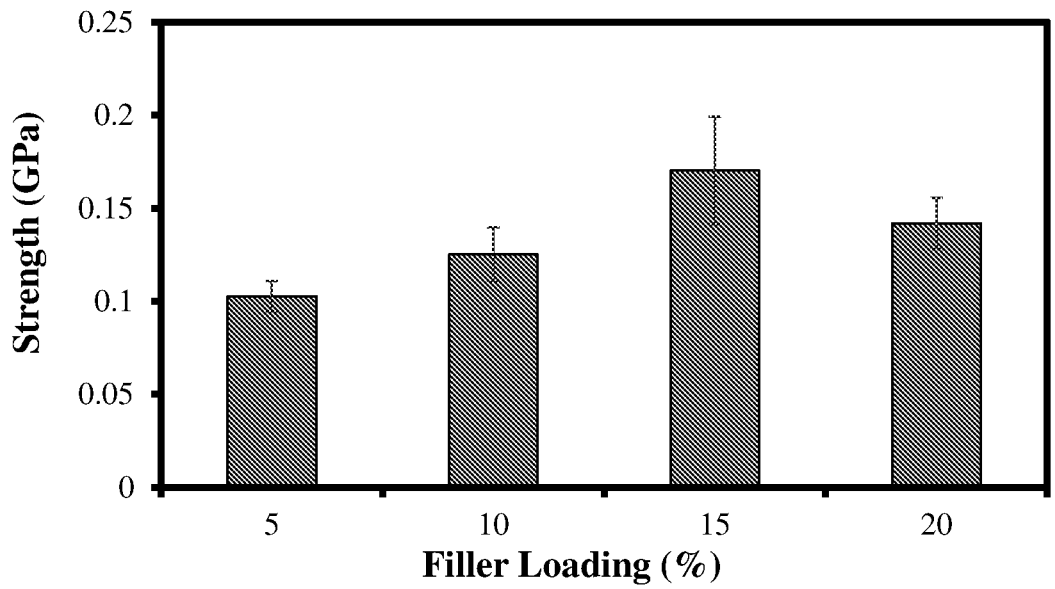
FIG. 10B is a graph showing the effect of different L-lactic acid-$BaSO_4$/PLLA loadings on tensile strength of the resultant composite.

Mechanical Properties of L-lactic Acid-BaSO$_4$
Composite with Different Filler Loadings FIG. 10A and FIG. 10B show the effect of different filler loadings on the tensile modulus and strength of composites derived from L-Lactic acid-BaSO$_4$ by grafting L-lactic acid monomers on the fillers with aluminate coupling agents and not using functional group(s) that can cause the interface between the hydrophobically modified particles and the hydrophobic polymeric matrix to become easily deformed due to lubricating nature of the stearic. The monomers form a stable hindrance layer between particles which inhibit the agglomeration and thus greatly improves the dispersability of the nanoparticles or fillers in PLLA matrix. Also, the L-lactic acid monomers grafted onto the BaSO$_4$ nanoparticles' surfaces penetrate into the PLLA matrix, mixing and entangling with the PLLA chains in the matrix. This helps to enhance the tensile modulus and tensile strength of the resultant composite. A high loading of hydrophobically modified particles in the hydrophobic polymer matrix can lead to agglomeration of the fillers which will in turn compromise the mechanical properties of the resultant composite. This may be the reason why tensile strength and modulus were lower at 20 wt % loading. The loading % in FIG. 10A and FIG. 10B are weight percentages based on weight of resultant composite.

Example 14

Mechanical Properties Comparison Between
Various Fillers

Figure 11A:
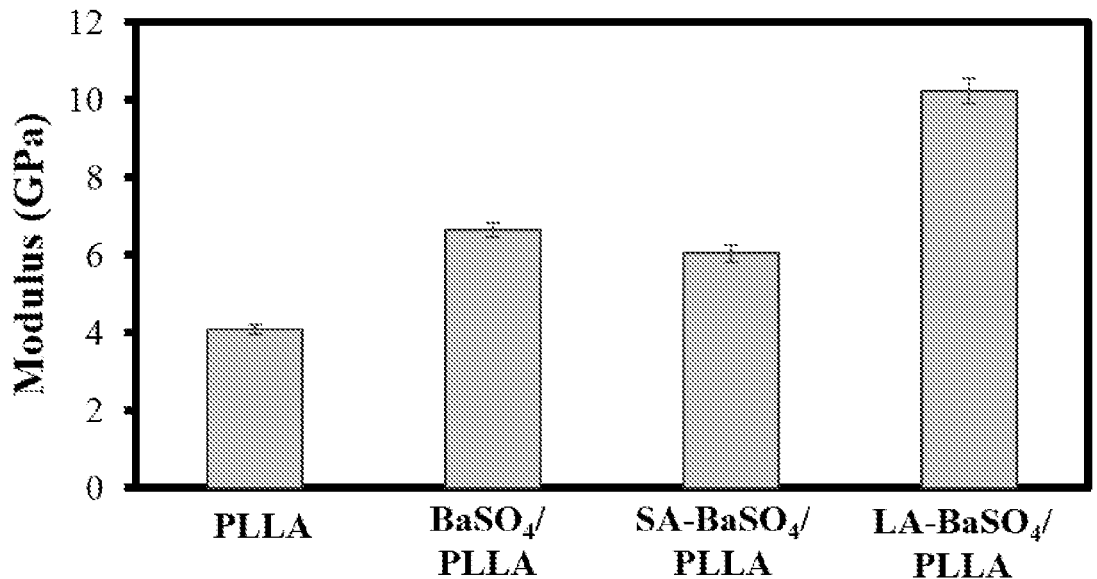
FIG. 11A is a graph showing the effect of using different fillers on tensile modulus of the resultant composite.
Figure 11B:
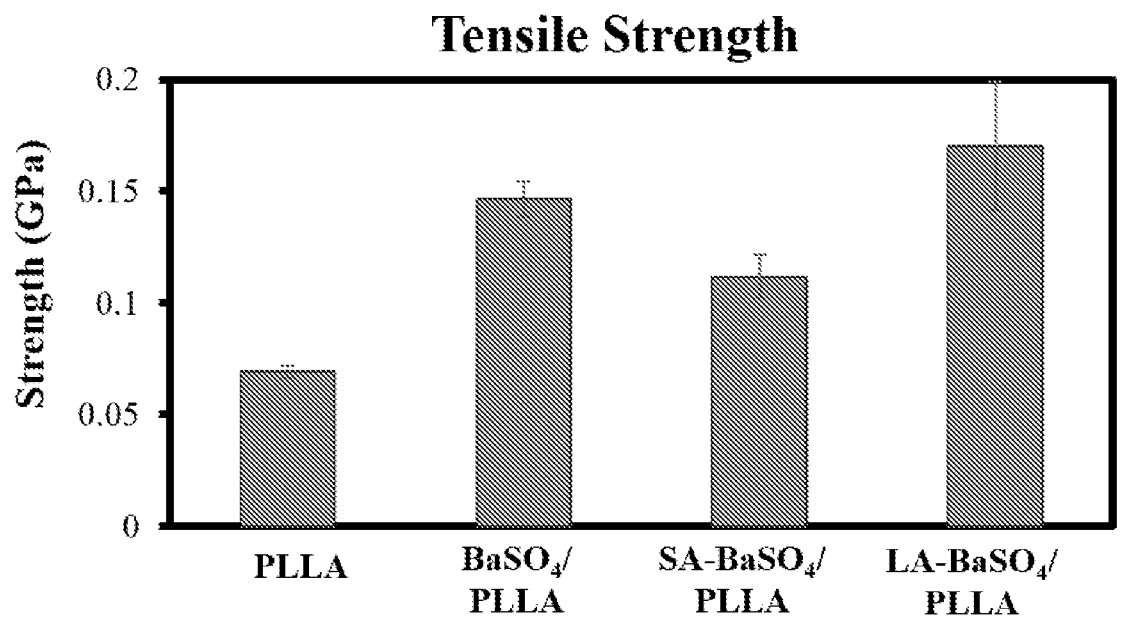
FIG. 11B is a graph showing the effect of using different fillers on tensile strength of the resultant composite.
Figure 11C:
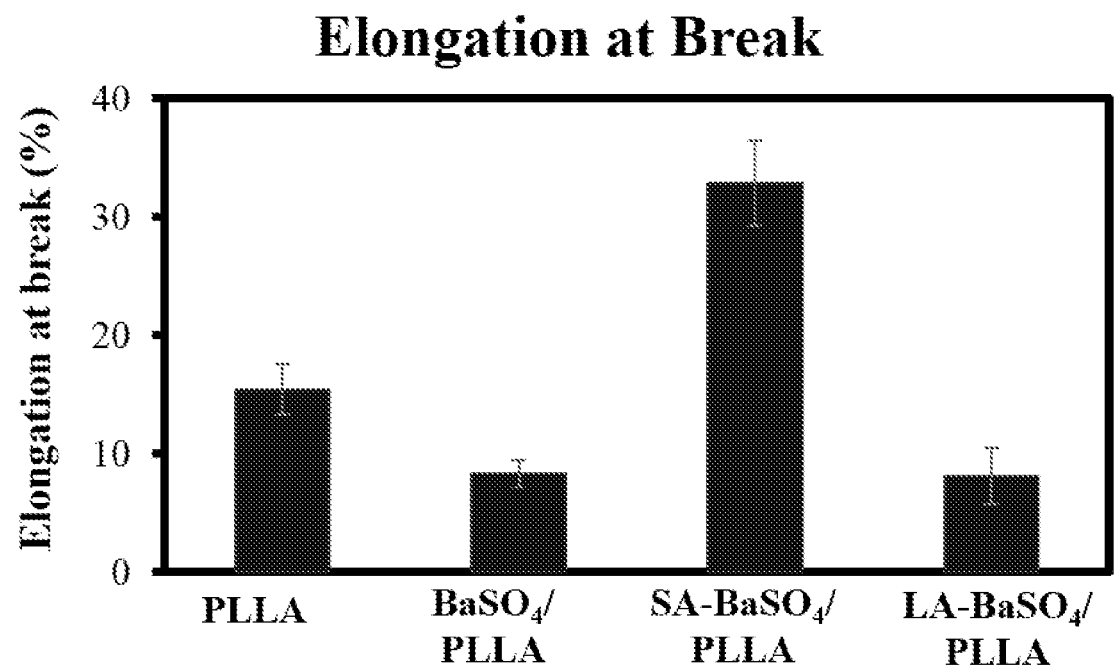
FIG. 11C is a graph showing the effect of using different fillers on elongation at break of the resultant composite.

FIG. 11A to FIG. 11C show a comparison of the mechanical properties for various composites derived from chemically functionalized BaSO$_4$ fillers. The mechanical properties of PLLA without fillers and non-functionalized BaSO$_4$ with PLLA are also shown. From FIG. 11A, the highest tensile modulus was attained with L-lactic acid-BaSO$_4$/PLLA (denoted as LA-BaSO$_4$/PLLA) fillers. From FIG. 11B, the highest tensile strength was also from L-lactic acid-BaSO$_4$/PLLA fillers. From FIG. 11C, SA-BaSO$_4$/PLLA fillers (i.e. stearic acid functionalized) demonstrated significantly higher elongation at break.

Example 15

Effect of Annealing on Mechanical Properties

Figure 12A:
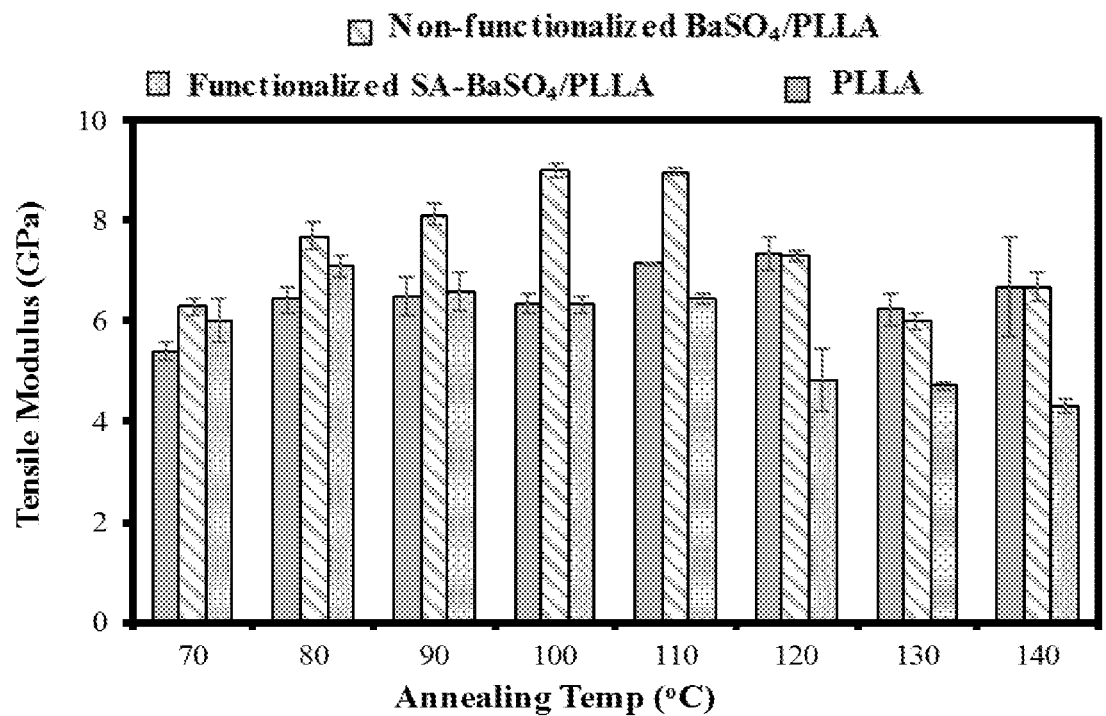
FIG. 12A is a graph showing the effect of annealing temperatures on mechanical properties of the resultant composite using different fillers. Specifically.
Figure 12B:
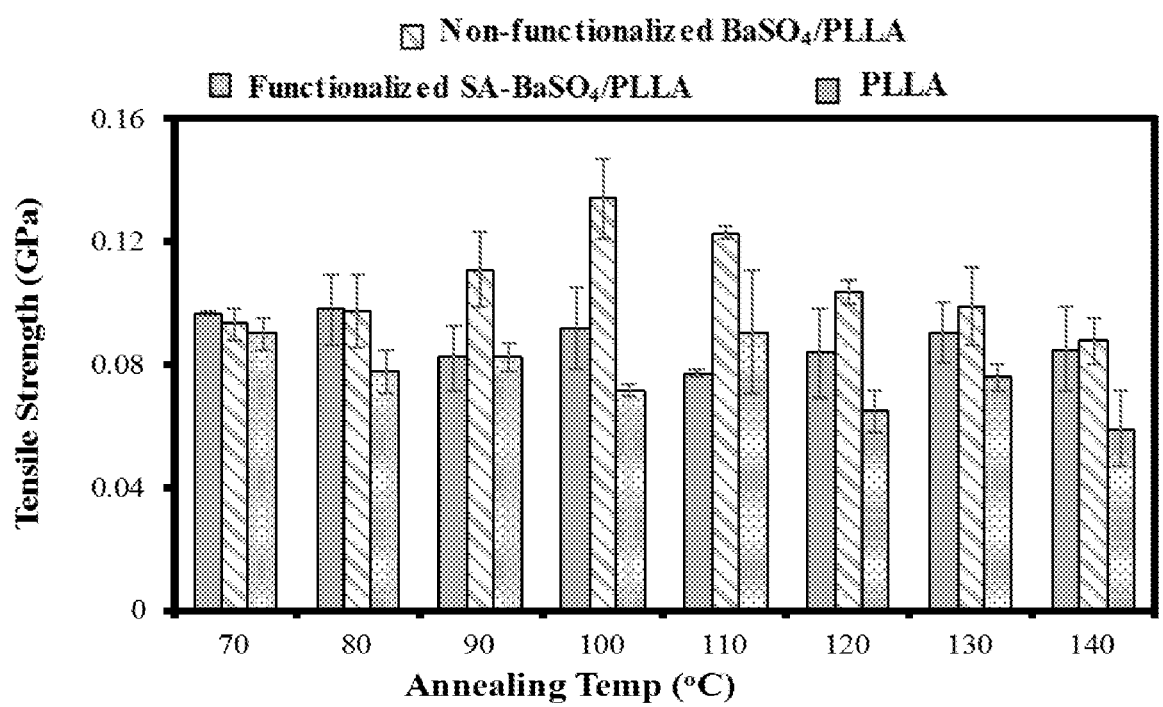
FIG. 12B is a graph showing the effect of annealing temperatures on mechanical properties of the resultant composite using different fillers. Specifically.

FIG. 12A shows the effect of annealing temperature on tensile modulus for various composite samples. FIG. 12B shows the effect of annealing temperature on tensile strength for the various composite samples. In FIG. 12A and FIG. 12B, non-functionalized BaSO$_4$/PLLA means that BaSO$_4$ particles without any functionalization are dispersed in PLLA. In FIG. 12A and FIG. 12B, functionalized BaSO$_4$/PLLA means the BaSO$_4$ particles are chemically functionalized with stearic acid (SA) before dispersing in PLLA. Aluminate coupling agent was used to link or conjugate stearic acid to the BaSO$_4$ nanoparticles. The results of PLLA without any fillers are also indicated in FIG. 12A and FIG. 12B.

In terms of tensile modulus and strength, significant improvement for non-functionalized materials was observed for temperatures in the range of 100° C. to 110° C. Meanwhile, significant decrease for functionalized (SA-BaSO$_4$)

was observed for temperatures of more than 120° C. There was no significance derived for elongation at break based on all the 3 samples and hence the elongation at break results are not shown.

Example 16

Effect of Annealing Specifically on LA-BaSO$_4$/PLLA

Figure 13A:
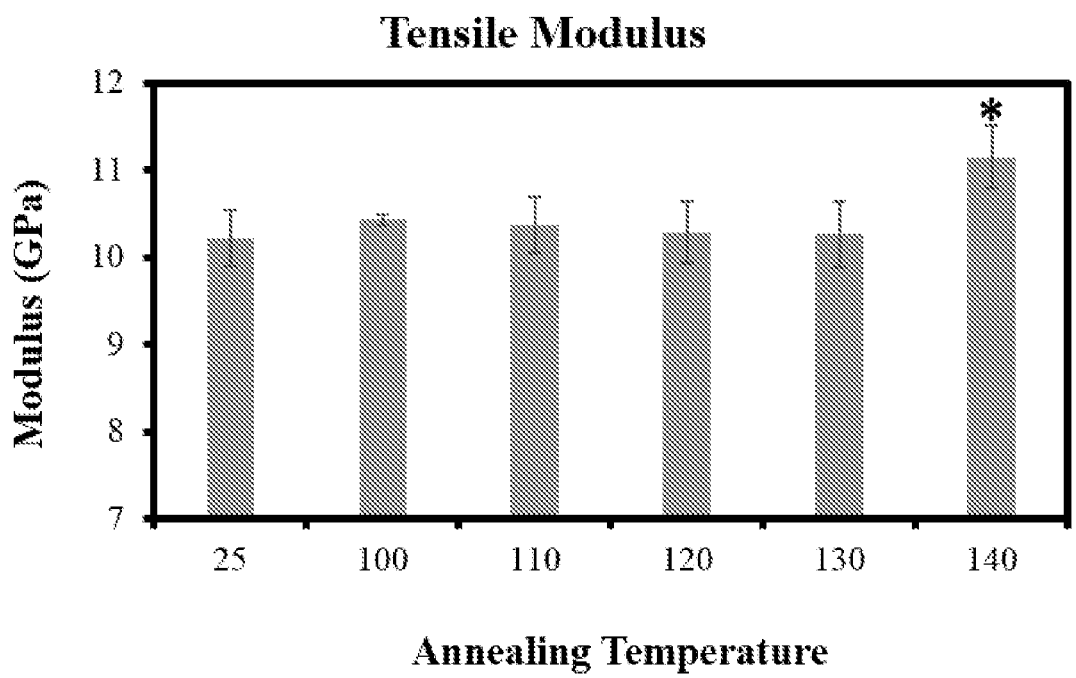
FIG. 13A is a graph showing the effect of annealing temperatures on tensile modulus of the resultant composite using L-lactic acid-$BaSO_4$/PLLA fillers.
Figure 13B:
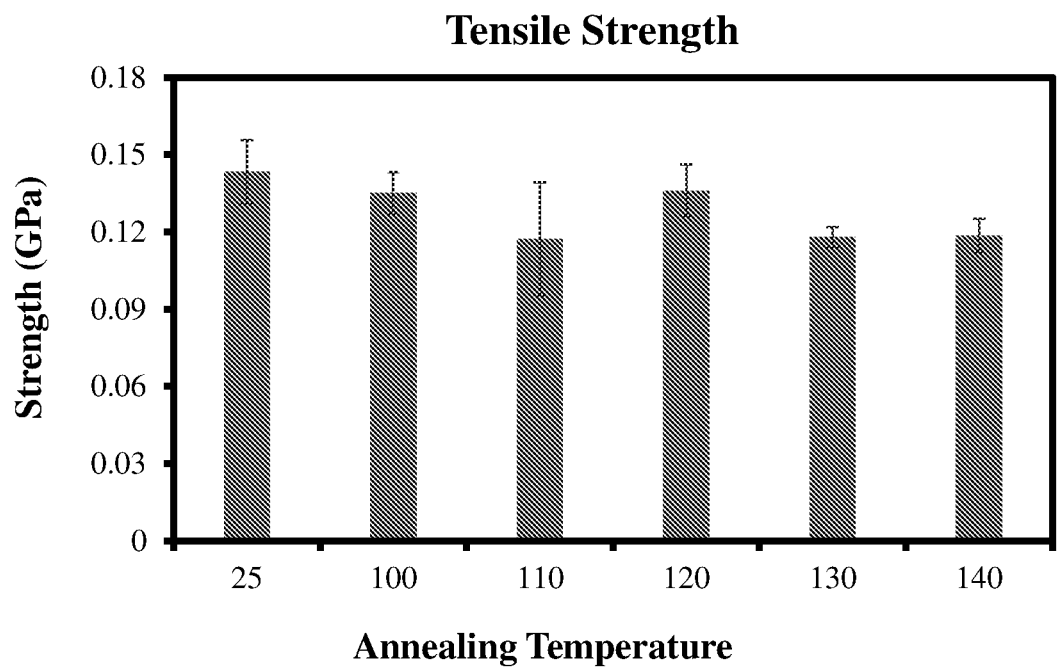
FIG. 13B is a graph showing the effect of annealing temperatures on tensile strength of the resultant composite using L-lactic acid-$BaSO_4$/PLLA fillers.

FIG. 13A and FIG. 13B show the effect of annealing temperature specifically on LA-BaSO$_4$/PLLA with aluminate coupling agents used, where LA denotes L-lactic acid. The modulus observed insignificant improvement at 140° C. and below (FIG. 13A). Tensile strength observed slight decrease, especially at higher annealing temperature (FIG. 13B). Elongation at break had no significant difference after annealing and hence not shown.

Example 17

Effect of Annealing with Different Loading of Fillers

Figure 14A:
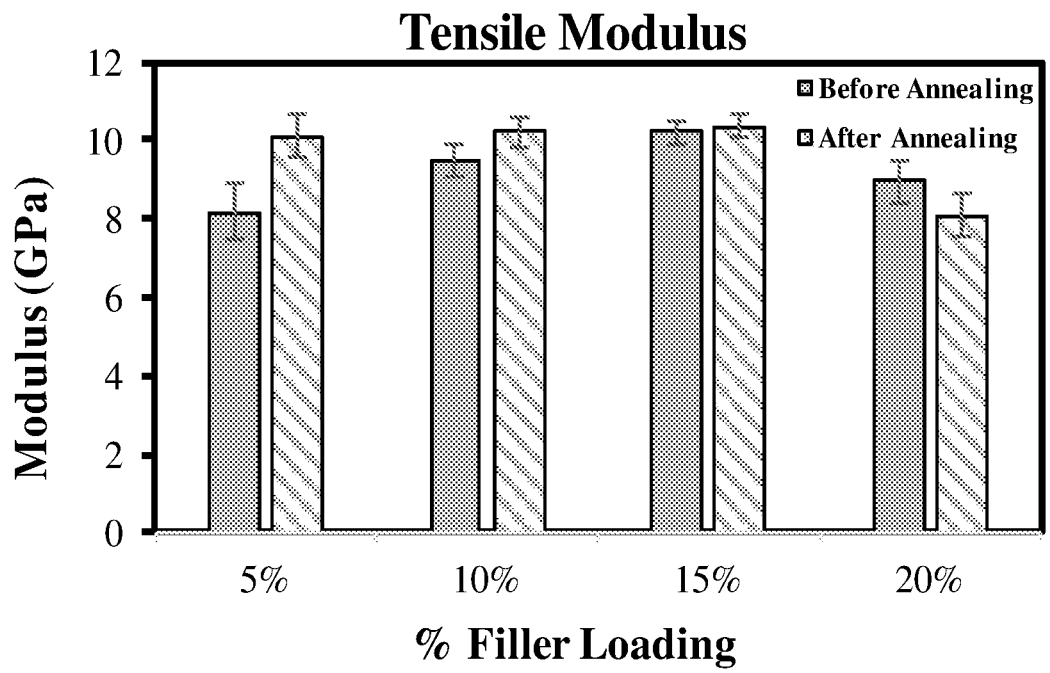
FIG. 14A is a graph showing the effect of loading of fillers on the tensile modulus of annealed L-lactic acid-$BaSO_4$/PLLA composite.
Figure 14B:
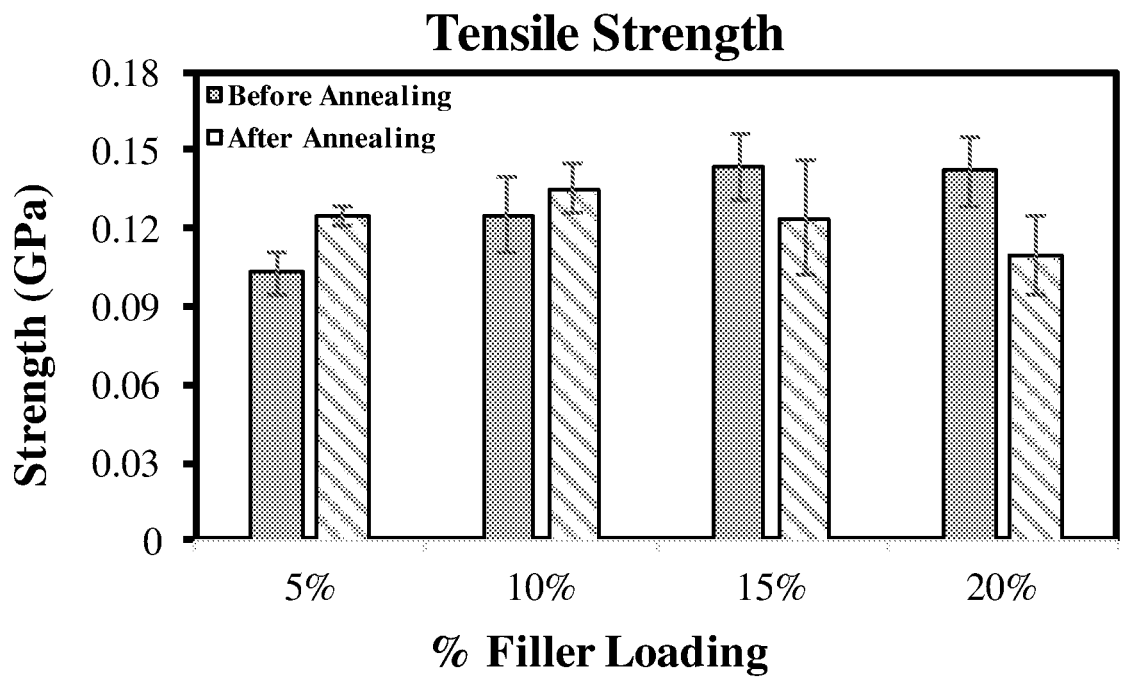
FIG. 14B is a graph showing the effect of loading of fillers on the tensile strength of annealed L-lactic acid-$BaSO_4$/PLLA composite.
Figure 14C:
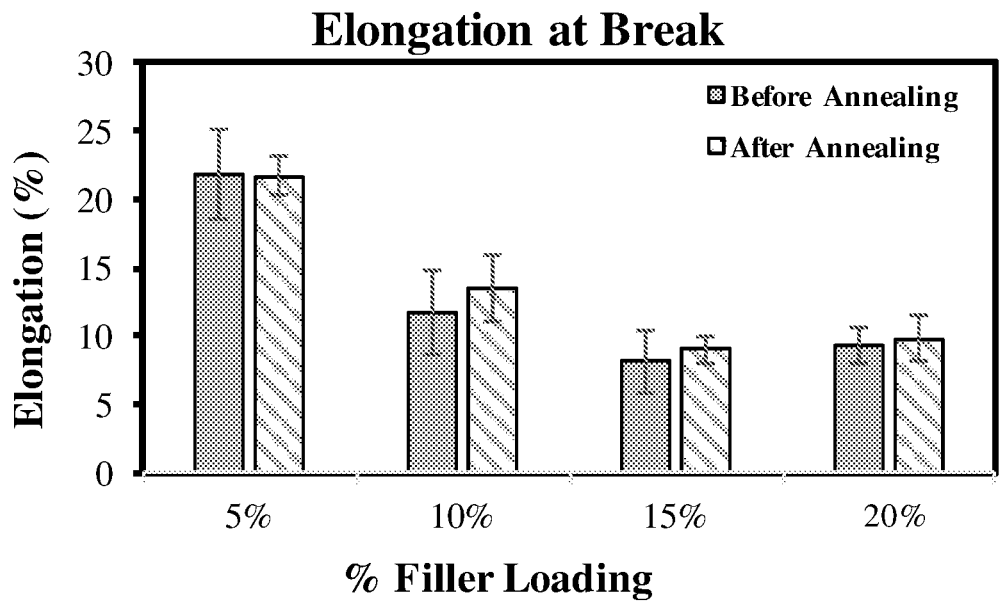
FIG. 14C is a graph showing the effect of loading of fillers on the elongation at break of annealed L-lactic acid-$BaSO_4$/PLLA composite.

The effects of annealing with LA-BaSO$_4$/PLLA composites of different loading of fillers are shown in FIG. 14A to FIG. 14C. An aluminate coupling agent was used to construct the composites for this example. From FIG. 14A and FIG. 14B, significant improvement in tensile modulus and tensile strength, respectively, were observed only at 5% loading fillers. The percentage is based on total weight of the resultant composite. No significant difference in elongation at break was observed between the different loadings after annealing (FIG. 14C).

Example 18

Effect of Nanoparticles on SMC's Viability

Figure 15A:
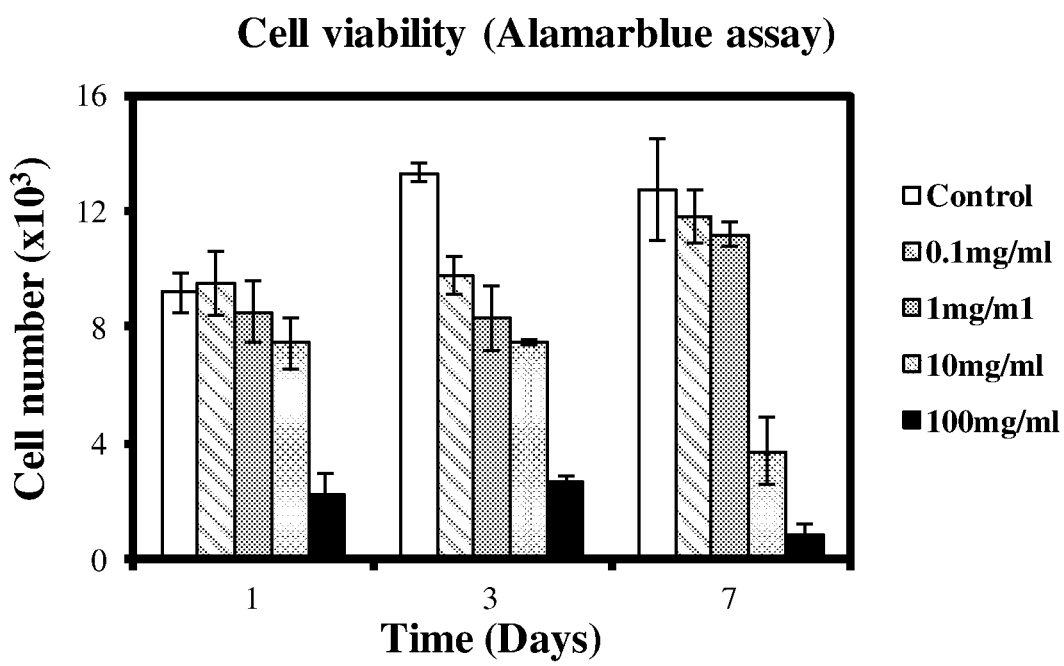
FIG. 15A is a graph showing the results of AlamarBlue assay, particularly the effect of concentration of non-functionalized fillers on smooth muscle cells' (SMCs) viability.

FIG. 15A shows the cell viability of smooth muscle cells (SMCs) at various concentrations of non-functionalized BaSO$_4$ nanoparticles. The nanoparticles were sterilized by washing with 70% ethanol twice followed by PBS twice. They were then added into media to make up the different dosages or concentrations. From there, the solutions of various concentration were added into wells seeded with SMCs. AlamarBlue assay was done on the designated exposure time. Comparable cell viability of the SMCs were observed when concentration is less than 1 mg/ml.

Figure 15B:
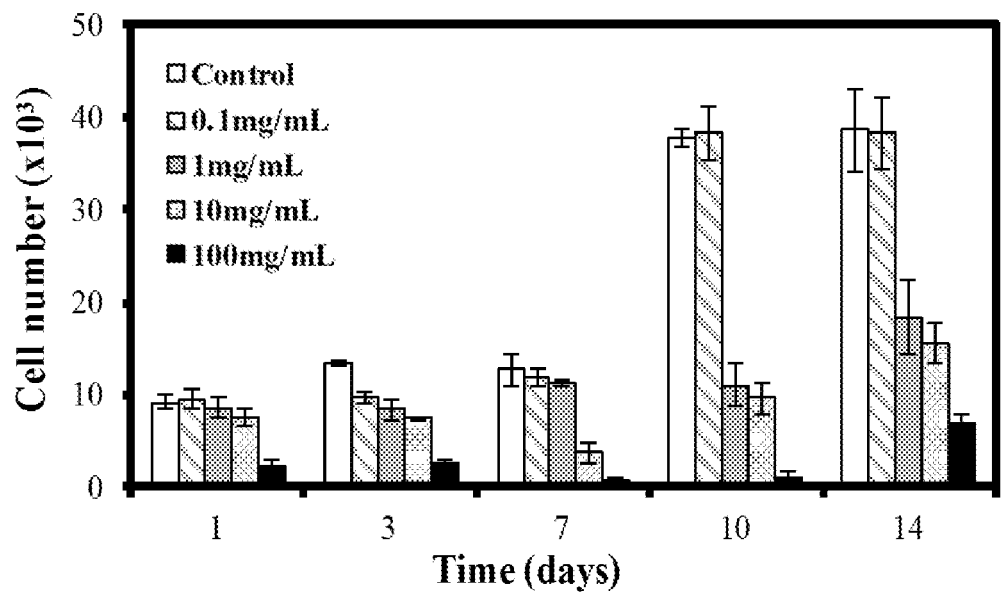
FIG. 15B is a graph showing the effect of non-functionalized $BaSO_4$ fillers on smooth muscle cells' (SMCs) viability.
Figure 15C:
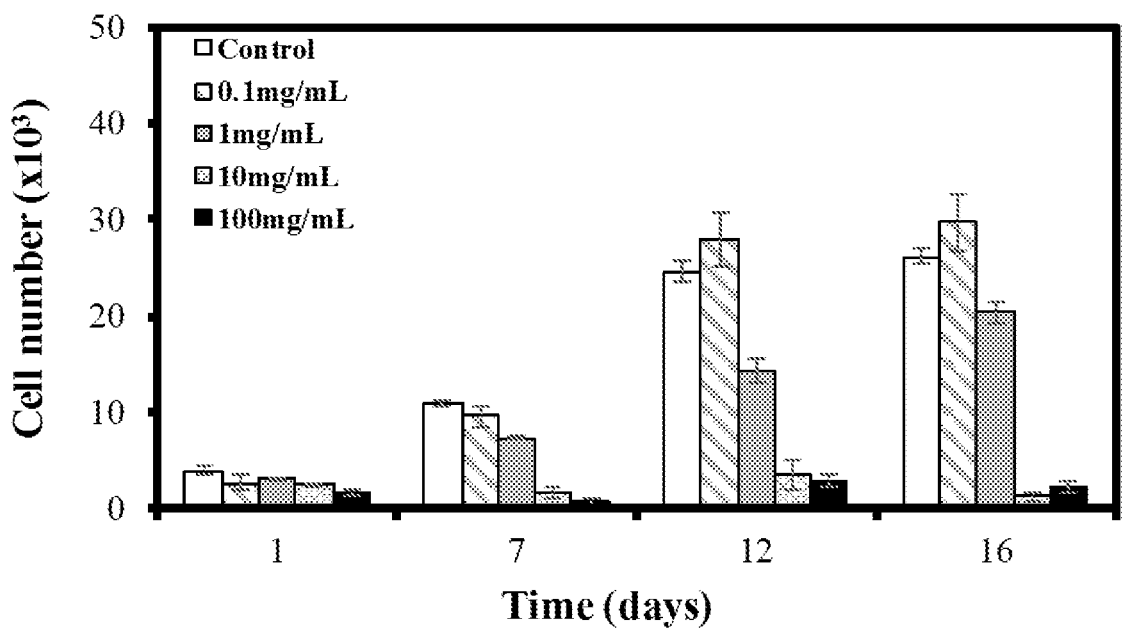
FIG. 15C is a graph showing the effect of functionalized L-lactic acid-$BaSO_4$ (denoted as LA-$BaSO_4$ in FIG. 15C) fillers on smooth muscle cells' (SMCs) viability.

FIG. 15B and FIG. 15C show the effect of non-functionalized BaSO$_4$ fillers and functionalized L-lactic acid-BaSO$_4$ (LA-BaSO$_4$) fillers, respectively, on SMC viability. Aluminate coupling agents were used for constructing the functionalized fillers in this example. Significant decrease in cell number at higher nanoparticles loading of more than 10 mg/ml was observed. Comparable viability of cells at 0.1 mg/ml nanoparticle exposure (with respect to control) was observed.

Example 19

Effect of Electrospun Monolithic Fibers on Composite

Figure 16:
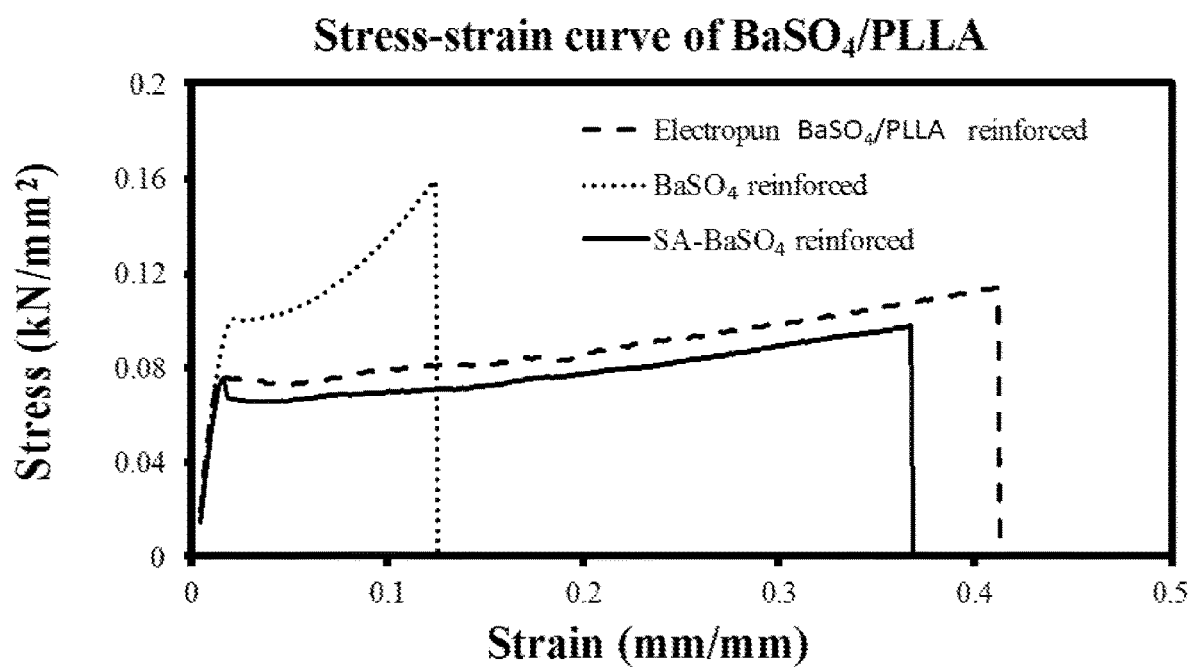
FIG. 16 is a plot of stress-strain curves of various composites which include using electrospun monolithic $BaSO_4$/PLLA fibers as fillers in PLLA resin, PLLA resin solely reinforced with $BaSO_4$ particles and PLLA resin solely reinforced with SA-$BaSO_4$ particles.

FIG. 16 shows a plot of the stress-strain relationship of the various PLLA composites. The results are summarized in table 1 below. BaSO$_4$ nanoparticles were electrospun together with PLLA (via solution electrospinning of BaSO$_4$ particles in a solution comprising PLLA dissolved in hexafluoroisopropanol (HFIP)) to form monolithic nanofibers. The monolithic nanofibers were then added to PLLA resin to be compounded into nanocomposite material. The loading of fillers was 15 wt % for all samples, wherein the wt % is based on weight of resultant composite.

TABLE 1

Comparison of Mechanical Properties of Various Composites

| Sample | Modulus (GPa) | Strength (GPa) | Elongation (%) |
| --- | --- | --- | --- |
| Monolithically electrospun BaSO$_4$/PLLA reinforced | 6.70 | 0.11 | 40.3 |
| BaSO$_4$ reinforced | 6.65 | 0.15 | 10.1 |
| SA-BaSO$_4$ reinforced | 6.03 | 0.11 | 37 |

No significant difference in modulus was observed between using monolithically electrospun BaSO$_4$/PLLA fibers as fillers and a composite solely reinforced with BaSO$_4$ nanoparticles. However, lower tensile strength and higher elongation at break were observed for the electrospun group. Aluminate coupling agent was used for the SA-BaSO$_4$ reinforced sample.

Example 20

Image Characterization of BaSO$_4$/PLLA Composite

Figure 17:
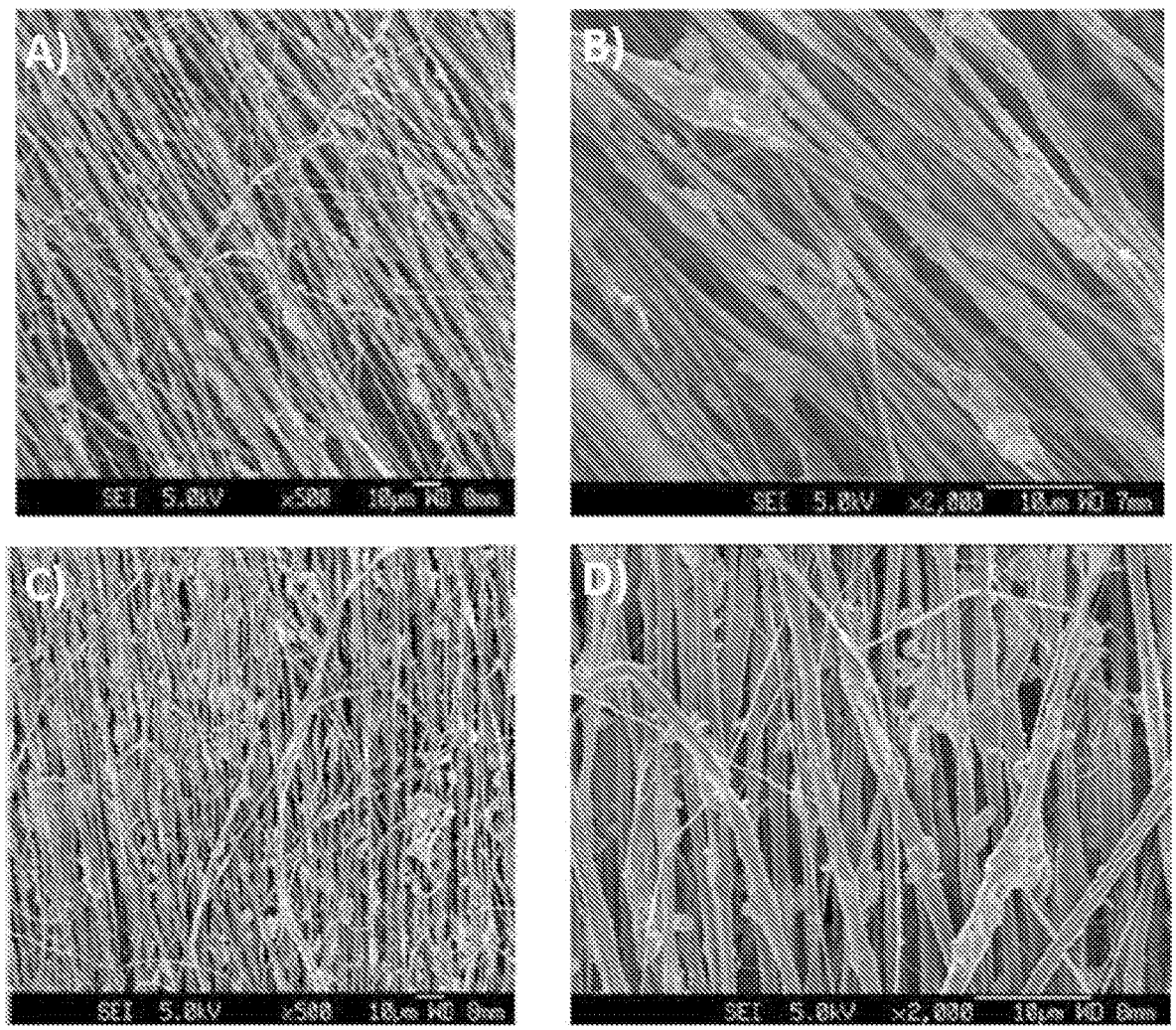
FIG. 17A is a scanning electron microscopy (SEM) image of the electrospun non-functionalized $BaSO_4$/PLLA monolithic fibers. The magnification is ×500 and the scale bar is 10 μm. This SEM image is taken near the edge of the sample.
FIG. 17B is a SEM image of the electrospun non-functionalized $BaSO_4$/PLLA monolithic fibers. The magnification is ×2000 and the scale bar is 10 μm.
FIG. 17C is a SEM image of the electrospun non-functionalized $BaSO_4$/PLLA monolithic fibers. The magnification is ×500 and the scale bar is 10 μm. This image is taken at the center of the same sample of FIG. 17A.
FIG. 17D is a SEM image of the electrospun non-functionalized $BaSO_4$/PLLA monolithic fibers. The magnification is ×2000 and the scale bar is 10 μm.

The TEM images of BaSO$_4$/PLLA composites are shown in FIG. 17A to FIG. 17D and FIG. 18A to FIG. 18D. The fibers illustrated in these figures were obtained via electrospinning at 1500 rpm. The fibers of FIG. 17A to FIG. 17D were obtained as electrospun non-functionalized BaSO$_4$/PLLA monolithic fibers. The SEM image of FIG. 17A is taken near the edge of the sample. FIG. 17B is a magnified version of FIG. 17A. The SEM image of FIG. 17C is taken at the center of the same sample of FIG. 17A. FIG. 17D is a magnified version of FIG. 17C.

Figure 18:
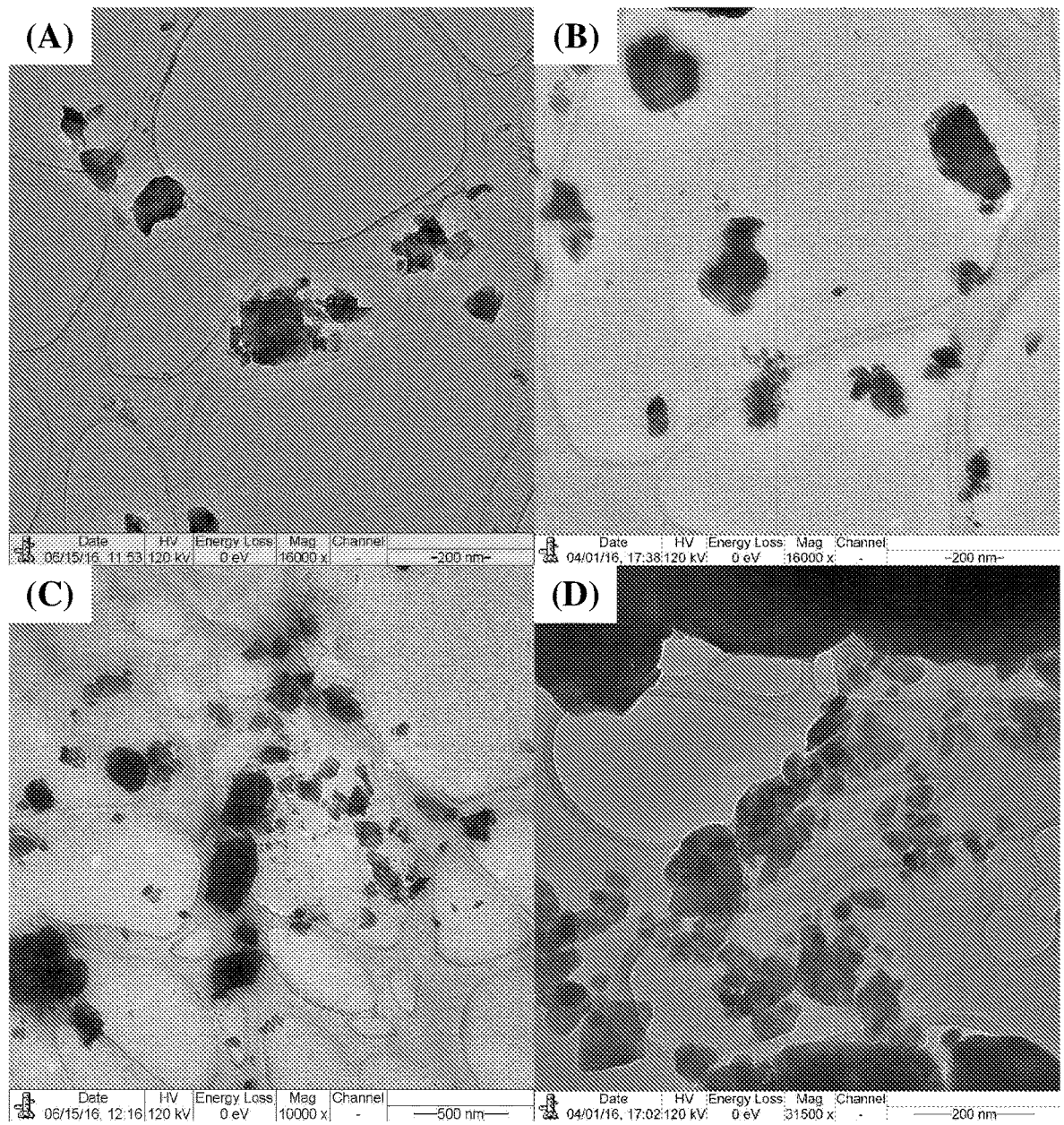
FIG. 18A shows a TEM image of a compounded $BaSO_4$/PLLA composite produced using electrospun $BaSO_4$/PLLA monolithic fibers as the fillers. Small agglomerated clusters of fillers are observed in the hydrophobic PLLA matrix. The magnification is ×16000 and the scale bar is 200 nm.
FIG. 18B shows a TEM image of a compounded $BaSO_4$/PLLA composite produced using electrospun $BaSO_4$/PLLA monolithic fibers as the fillers. Small agglomerated clusters of fillers are observed in the hydrophobic PLLA matrix. The magnification is ×16000 and the scale bar is 200 nm. The TEM image of FIG. 18B is taken at a different part of the sample from which the TEM image of FIG. 18A is taken.
FIG. 18C shows a TEM image of a compounded $BaSO_4$/PLLA composite produced using non-functionalized $BaSO_4$ nanoparticles as the fillers. Larger agglomerated clusters of the hydrophilic fillers are observed in the hydrophobic PLLA matrix compared to the clusters of FIG. 18A and FIG. 18B. The magnification is ×10000 and the scale bar is 500 nm.
FIG. 18D shows a TEM image of a compounded $BaSO_4$/PLLA composite produced using non-functionalized $BaSO_4$ nanoparticles as the fillers. Larger agglomerated clusters of the hydrophilic fillers are observed in the hydrophobic PLLA matrix compared to the clusters of FIG. 18A and FIG. 18B. The magnification is ×31500 and the scale bar is 200 nm. The TEM image of FIG. 18D is taken at a different part of the sample from which the TEM image of FIG. 18C is taken.

Meanwhile, FIG. 18A and FIG. 18B show composites derived using monolithic BaSO$_4$/PLLA fibers as the fillers. The TEM image of FIG. 18B is taken at a different part of the sample from which the TEM image of FIG. 18A is taken. Small agglomerated clusters of the fillers were observed in FIG. 18A and FIG. 18B. This is in contrast to FIG. 18C and FIG. 18D where larger agglomerated clusters of fillers were observed in PLLA hydrophobic polymer matrix. The TEM image of FIG. 18D is taken at a different part of the sample from which the TEM image of FIG. 18C is taken. The fillers of FIG. 18C and FIG. 18D were non-functionalized BaSO$_4$ nanoparticles. Based on this, it can be seen that hydrophilic particles such as BaSO$_4$ nanoparticles, which are not hydrophobically modified (i.e. non-functionalized), suffer from agglomeration instead of being dispersed in a hydrophobic polymer matrix such as PLLA.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A hydrophobic polymeric composite comprising a hydrophobic polymer matrix with hydrophobically modified particles dispersed therein, wherein the hydrophobically modified particles each comprises a hydrophilic particle comprising an organic moiety which changes the hydrophilic particle into a hydrophobically modified particle, and wherein the hydrophilic particle comprises barium sulphate, zirconia, tantalum oxide, or bismuth oxide, wherein the organic moiety comprises a conjugating group and a functional group, wherein the conjugating group is derived from an aluminate coupling agent, and wherein the functional group is derived from L-lactic acid.

2. The hydrophobic polymeric composite according to claim 1, wherein the hydrophobic polymer matrix comprises poly(alpha-hydroxyesters), polycarbonates, polyurethanes, or polyalkanoates.

3. The hydrophobic polymeric composite according to claim 2, wherein the poly(alpha-hydroxyesters) are selected from the group consisting of polylactic acid, poly-(l-lactide), poly-(d,l-lactide), poly(glycolic) acid, poly(lactide-co-glycoside acid), polycaprolactone, poly(p-dioxanone), and poly(lactide-co-trimethylene carbonate).

4. The hydrophobic polymeric composite according to claim 2, wherein the polyalkanoates comprise poly(3-hydroxybutyrate).

5. The hydrophobic polymeric composite according to claim 1, wherein the hydrophobically modified particles are 1 nm to 100 μm.

6. The hydrophobic polymeric composite according to claim 1, wherein the hydrophobically modified particles comprise 1 wt % to 40 wt % of the hydrophobic polymeric composite.

7. A method of synthesizing a hydrophobic polymeric composite comprising a hydrophobic polymer matrix with hydrophobically modified particles dispersed therein, wherein the hydrophobically modified particles each comprises a hydrophilic particle comprising an organic moiety which changes the hydrophilic particle into a hydrophobically modified particle, and wherein the hydrophilic particle comprises barium sulphate, zirconia, tantalum oxide, or bismuth oxide, the method comprising the steps of:

separately contacting hydrophilic particles with a conjugating agent and then a functionalizing agent to change the hydrophilic particles into the hydrophobically modified particles, wherein the hydrophilic particles comprise barium sulphate, zirconia, tantalum oxide, or bismuth oxide, wherein the conjugating agent comprises a conjugating group derived from an aluminate coupling agent, and wherein the functionalizing agent comprises a functional group comprising L-lactic acid; and blending the hydrophobically modified particles with a hydrophobic polymer matrix to form the hydrophobic polymeric composite.

8. The method according to claim 7, wherein the blending is carried out by directly mixing the hydrophobic polymer matrix with the hydrophobically modified particles or by mixing the hydrophobically modified particles with a hydrophobic polymer matrix solution.

9. The method according to claim 8, wherein the hydrophobic polymer matrix and the hydrophobic polymer matrix solution comprise poly(alpha-hydroxyesters), polycarbonates, polyurethanes, or polyalkanoates.

10. The method according to claim 9, wherein the poly(alpha-hydroxyesters) are selected from the group consisting of polylactic acid, poly-(l-lactide), poly-(d, l-lactide), poly(glycolic) acid, poly(lactide-co-glycoside acid), polycaprolactone, poly(p-dioxanone), and poly(lactide-co-trimethylene carbonate).

11. The method according to claim 9, wherein the polyalkanoates comprise poly(3-hydroxybutyrate).

12. The method according to claim 8, wherein the hydrophobic polymer matrix solution comprising the mixed hydrophobically modified particles is casted on a substrate and then allowed to evaporate at 25° C. for up to 24 hours to form the hydrophobic polymeric composite, wherein the substrate comprises a glass surface.

13. The method according to claim 7, further comprising a step of annealing the hydrophobic polymeric composite at a temperature of 70° C. to 140° C. for up to 24 hours.

* * * * *